US010830882B2

(12) United States Patent
Shollenberger

(10) Patent No.: US 10,830,882 B2
(45) Date of Patent: Nov. 10, 2020

(54) METHODS AND APPARATUS FOR DISTRIBUTED, MULTI-NODE, LOW-FREQUENCY RADAR SYSTEMS FOR DEGRADED VISUAL ENVIRONMENTS

(71) Applicant: GE Aviation Systems, LLC, Grand Rapids, MI (US)

(72) Inventor: Dean Shollenberger, Grand Rapids, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 659 days.

(21) Appl. No.: 15/627,027

(22) Filed: Jun. 19, 2017

(65) Prior Publication Data

US 2019/0018128 A1  Jan. 17, 2019

(51) Int. Cl.
| G01S 13/524 | (2006.01) |
| G01S 13/534 | (2006.01) |
| G01S 13/90 | (2006.01) |
| G01S 13/58 | (2006.01) |
| G01S 13/42 | (2006.01) |

(Continued)

(52) U.S. Cl.
CPC ........ G01S 13/5242 (2013.01); G01S 13/003 (2013.01); G01S 13/42 (2013.01); G01S 13/534 (2013.01); G01S 13/582 (2013.01); G01S 13/9029 (2013.01); G01S 13/935 (2020.01); *G01S 13/9047* (2019.05)

(58) Field of Classification Search
CPC ............................ G01S 13/5242; G01S 13/534
USPC ....................................................... 342/161
See application file for complete search history.

(56) References Cited

U.S. PATENT DOCUMENTS

| 2,593,071 A | 4/1952 | Sunstein et al. |
| 6,081,220 A | 6/2000 | Fujisaka et al. |

(Continued)

FOREIGN PATENT DOCUMENTS

| JP | 2000266833 A | 9/2000 |
| JP | 5601881 B2 | 10/2014 |
| KR | 10-1389516 B1 | 5/2014 |

OTHER PUBLICATIONS

International Preliminary Report on Patentability received for PCT Application No. PCT/US2018/033851, dated Jan. 2, 2020, 8 pages.

*Primary Examiner* — Erin F Heard
*Assistant Examiner* — Helena H Seraydaryan
(74) *Attorney, Agent, or Firm* — Wood IP LLC

(57) ABSTRACT

Methods, apparatus, systems and articles of manufacture are disclosed for distributed, multi-node, low frequency radar systems for degraded visual environments. An example system includes a transmitter to transmit a radar signal. The example system includes a distributed network of radar receivers to receive the radar signal at each receiver. The example system includes a processor to determine a first range and a first angular position of a background point based on return time, wherein the first range and the first angular position are included in first data; determine a second range and a second angular position of the background point based on doppler shift, wherein the second range and the second angular position are included in second data; determine a refined range and a refined angular position, wherein the refined range and refined angular position are included in third data, and generate a radar map based on third data.

20 Claims, 16 Drawing Sheets

(51) Int. Cl.
  *G01S 13/00* (2006.01)
  *G01S 13/935* (2020.01)

(56) References Cited

U.S. PATENT DOCUMENTS

| | | | |
|---|---|---|---|
| 6,218,983 B1* | 4/2001 | Kerry | G01S 13/003 |
| | | | 342/149 |
| 7,978,124 B2 | 7/2011 | Cook et al. | |
| 8,169,362 B2 | 5/2012 | Cook et al. | |
| 8,207,887 B2 | 6/2012 | Goldman | |
| 8,462,040 B2 | 6/2013 | Venkatachalam et al. | |
| 8,730,092 B2 | 5/2014 | Jaffer et al. | |
| 8,854,255 B1 | 10/2014 | Ehret | |
| 2004/0178943 A1* | 9/2004 | Niv | G01S 13/50 |
| | | | 342/29 |
| 2012/0249741 A1* | 10/2012 | Maciocci | G06F 3/011 |
| | | | 348/46 |
| 2017/0164157 A1 | 6/2017 | Rowitch | |

* cited by examiner

METHODS AND APPARATUS FOR DISTRIBUTED, MULTI-NODE, LOW-FREQUENCY RADAR SYSTEMS FOR DEGRADED VISUAL ENVIRONMENTS

FIELD OF THE DISCLOSURE

This disclosure relates generally to radar mapping and detection systems, and, more particularly, to methods and apparatus for distributed, multi-node, low-frequency radar systems for degraded visual environments.

BACKGROUND

In recent years, more aircraft have been required to maneuver at low altitudes. Low altitude aircraft operations can include flying in inclement weather such as rain, snow, sandstorms, etc. Aircraft, flying in inclement weather and maneuvering at low altitudes, must additionally avoid obstacles such as cell towers and power lines.

Aircraft use radar systems to detect obstacles nearby, in the aircraft flight environment. Radar systems transmit radio frequencies and receive the radio signal and use the time delay and doppler shift of the radio signal to determine a location and/or velocity of objects in the environment of the aircraft operating the radar system. Additionally or alternatively, data from the radar system is coalesced with thermal and visual systems to provide a graphical display of the objects in the environment of the aircraft.

Figure 1:
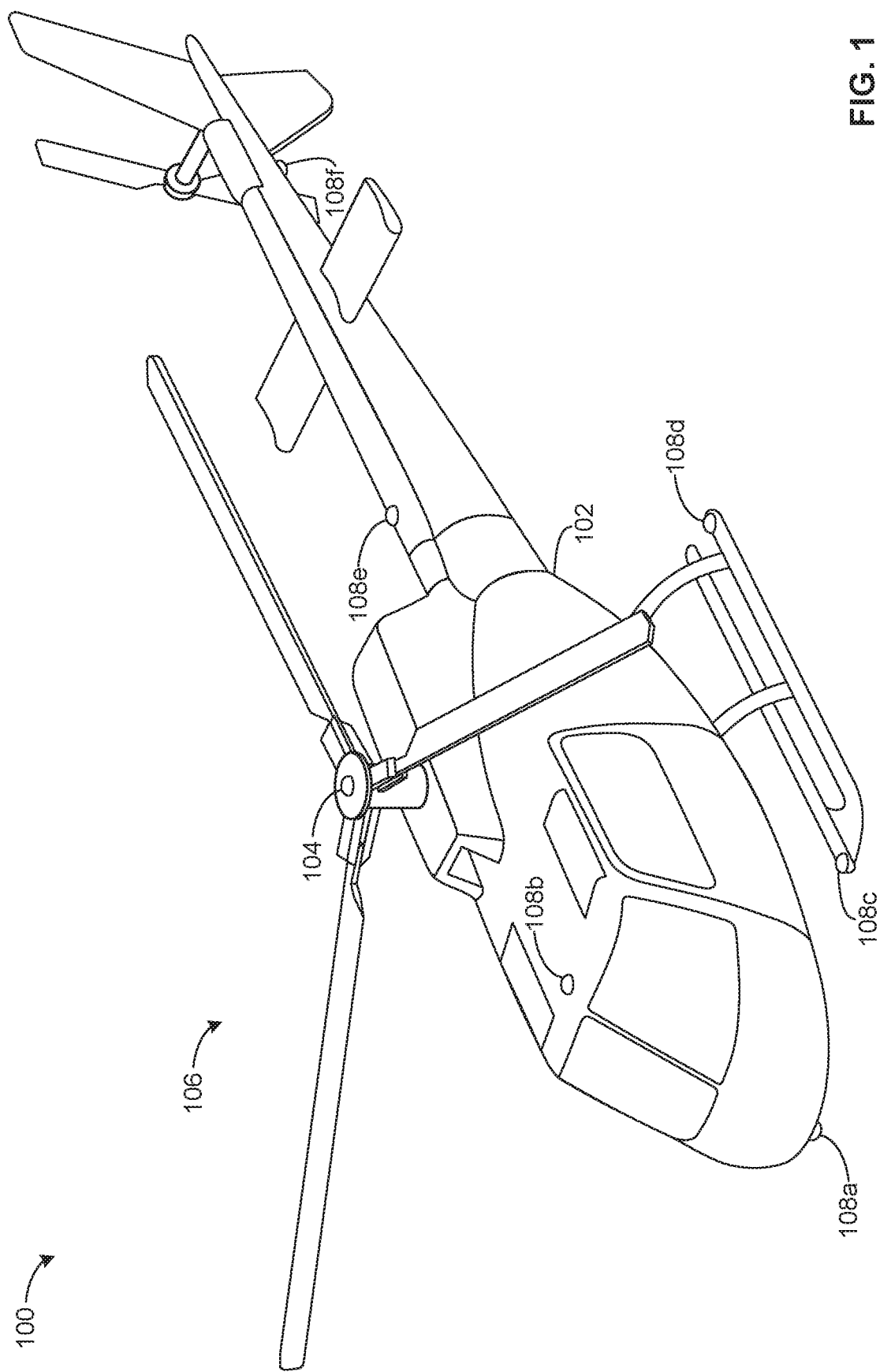
FIG. 1 illustrates an example multi-node radar system disposed on an aircraft platform.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

BRIEF SUMMARY

Methods, apparatus, systems, and articles of manufacture are disclosed for distributed, multi-node, low-frequency radar systems for degraded visual environments.

Certain examples provide a multi-node radar system including a radar transmitter to transmit a radar signal. The example system additionally includes a distributed network of radar receivers to receive the radar signal at each radar receiver of the distributed network of radar receivers. The example system additionally includes a processor to determine a first range and a first angular position of a background point based on a return time detected at each radar receiver of the distributed network of radar receivers, wherein the first range and the first angular position are included in first radar data; and determine a second range and a second angular position of the background point based on a doppler shift detected at each radar receiver of the distributed network of radar receivers, wherein the second range and the second angular position are included in second radar data. The example processor also refines the first and second range and the first and second angular position of the background point by at least coalescing first radar data and second radar data to determine a refined range and a refined angular position of a background point, wherein the refined range and the refined angular position are included in third radar data. The example processor also generates a radar map based on the third radar data.

Certain examples provide a method to improve radar map resolution in inclement weather. The example method including receiving a low frequency radar signal at each radar receiver of a distributed network of radar receivers. The example method additionally includes determining, by executing instructions via a processor, a first range and a first angular position of a background point based on a return time detected at each radar receiver of the distributed network of radar receivers, wherein the first range and the first angular position are included in first radar data; and determining, by executing instructions via the processor, a second range and a second angular position of a background point based on a doppler shift detected at each radar receiver of the distributed network of radar receivers, wherein the second range and the second angular position are included in second radar data. The example method also includes refining the first and second range and the first and second angular position of the background point by at least coalescing the first radar data and the second radar data to determine a refined range and a refined angular position of the background point, wherein the refined range and the refined angular position of the background point are included in third radar data. The example processor will also generate a radar map based on the third radar data.

Certain examples provide a tangible computer readable storage medium comprising instructions that, when executed, cause an at least one processor to at least transmit a low frequency radar signal. The example instructions that, when executed, cause the at least one processor to at least receive the low frequency radar signal at each radar receiver of a distributed network of radar receivers. The example instructions that, when executed, cause the at least one processor to determine a first range and a first angular position of a background point based on a return time detected at each radar receiver of the distributed network of radar receivers, wherein the first range and the first angular position are included in first radar data; and determine a second range and a second angular position of a background point based on a doppler shift detected at each radar receiver of the distributed network of radar receivers, wherein the second range and the second angular position are included in second radar data. The example instructions that, when executed, additionally cause the at least one processor to refine the first and second range and the first and second angular position of the background point by at least coalescing the first radar data and the second radar data to determine a refined range and a refined angular position, wherein the refined range and the refined angular position is included in third radar data. The example instructions that, when executed, additionally cause the at least one processor to generate a radar map based on the third radar data.

DETAILED DESCRIPTION

Aircraft can be required to maneuver at low altitude, including nap-of-the-earth (NOE) flight. NOE flight can include maneuvering at altitudes as little as five feet above ground level. Low altitude, NOE flight requires advanced radar and instrumentation systems to avoid collision with structures (e.g., buildings, water towers, etc.), changes to the terrain (e.g., hills, trees, canyons, etc.), and utility infrastructure (e.g., telephone wires, power lines, etc.).

Normal radar systems, such as the ones used on aircraft, are electromagnetic systems for detection and location of objects that reflect electromagnetic energy. The transmission and reception of radar signals (e.g., radio signals) is used to determine the location and/or velocity of an object or background point.

Common radar systems include a transmitter and receiver, the transmitter and receiver often sharing an antenna. The transmitter generates an electromagnetic (e.g., radio) radar signal in a direction. In some examples, the transmitted radar signal propagates away from the antenna until it impacts a target and is redirected in many directions. The transmitted radar signal, after impact against a target, is partially redirected back to the radar antenna. For example, the redirected radar signal is a fraction of the power of the transmitted signal and can travel several miles on the order of microseconds (e.g., It takes approximately 12.4 µs to travel a nautical mile and back).

The distance of a target from the radar antenna is calculated based on the known velocity of the radar signal (e.g., the speed of light through a vacuum, or altered by known values as a function of the medium such as air or water) and a time delay between transmission of the radar signal and detection of the redirected radar signal. Additionally or alternatively, if the radar signal is a sinewave signal, the Doppler shift (e.g., the change in the signal frequency between the transmission signal and the redirected radar signal) can be used to calculate a radial velocity of an object (e.g., the portion of the velocity of the object in the direction of the radar antenna).

In some examples, radar systems utilized by aircraft use high frequency radar signals. High frequency radar signals provide high radar map resolution views of the surrounding environment, however, high frequency radar does not provide the high resolution view in inclement weather (e.g., rain, snow, sandstorm, etc.) due to backscatter and absorption. Low frequency radar signals (e.g., between 1 gigahertz (GHz) and 10 GHz) do not provide the high radar map resolution view attainable with the high frequency radar signal, particularly in the angle domain, but the low frequency radar signal is not impeded by the presence of inclement weather. For example, volume backscatter from water droplets of typical size in rainy weather is approximately 1000 times smaller at 2 GHz than at 11 GHz.

In accordance with the present disclosure, a low frequency radar signal used in conjunction with a distributed network of radar receivers attains a high radar map resolution and not be impeded by the presence of inclement weather. For example, several radar receivers distributed across the frame of an aircraft, such as a helicopter, can, in the detection of the same transmitted radar signal, filter out backscatter, compensate for inaccuracies in the angle domain, and produce a high resolution radar map.

In some examples, a distributed network of radar receivers (e.g., a multi-node radar system) is disposed on a helicopter flying in inclement weather. A single transmitter generates an example radar signal which is reflected off background points and backscatter and is reflected (e.g., scattered) in many directions. For example, the radar signal is reflected off a background point, scattered, and directed back to each receiver of the multi-node radar system. Radar receivers of the multi-node radar system can, for example, leverage the communication infrastructure already on the aircraft.

Radar signals received at each receiver of the multi-node radar system are processed. For example, processing of the radar signal includes determining a range the radar signal propagated before being reflected and returning to the receiver. With locations of the receivers and transmission source being known, solving the simultaneous equations of return time and constant doppler cones for each receiver determines the object location. Additionally or alternatively, the radar signal is evaluated for Doppler shift to determine the relative radial velocity of the object that reflected the radar signal. In some examples, the multi-node radar system also processes radar signals using phase comparisons calculations to eliminate false grating lobe (e.g., ambiguous solutions) indications.

In accordance with the present disclosure, the information gathered from each of the receivers is coalesced and filtered. Inconsistent information received from each of the distributed network of radar receivers is not included in any generated radar map. The coalescing and filtering of low frequency radar data provides the high radar map resolution normally associated with high frequency radar systems. Additionally, the coalescing and filtering of low frequency radar data provides visibility in inclement weather not possible with high frequency radar systems. Additionally or alternatively, the present disclosure can also be implemented with other systems including sonar, lidar, etc.

Additionally or alternatively, the present disclosure can be implemented as a multi-platform radar system. For example, a distributed network of radar receivers is disposed on two helicopters, each capable of operating as an individual network of radar receivers. The two distributed networks of radar receivers can transmit their filtered radar data and further improve the accuracy of the radar map generated at each platform. In such an example, the radar signal received at each receiver of the distributed network of radar receivers after being coalesced, filtered, and transmitted is coalesced and filtered again with the information received from the second distributed network of radar receivers, further improving the generated radar map.

FIG. 1 illustrates an example multi-node radar system 100 disposed on an aircraft platform 102. The aircraft platform 102 can, for example, be any aircraft (e.g., an airplane, an unmanned aerial vehicle (UAV), a drone, etc.). The aircraft platform, during normal operation travels, having a velocity (e.g., speed along a direction vector) and subject to acceleration (e.g., a change in velocity such as a change in speed or direction). In the illustrated example, the aircraft platform 102 includes a radar transceiver 104 and a distributed network of radar receivers 106 having receivers 108a, 108b, 108c, 108d, 108e, and 108f In some examples, receivers 108a, 108b, 108c, 108d, 108e, and 108f include various communication infrastructure (e.g., radio antenna, global positioning system (GPS) receiver, etc.) and the number of receivers may be greater or fewer.

The example multi-node radar system transmits a low frequency radar signal from the radar transceiver 104. After the example transceiver 104 transmits the low frequency radar signal, the distributed network of radar receivers 106 waits to receive a reflected radar signal. Example receivers 108a, 108b, 108c, 108d, 108e, and 108f are distributed across the aircraft platform 102. In some examples, the distribution of the distributed network of radar receivers 106 is uniform at half-wavelength distances from one another to reduce false angular returns, while in other examples a distribution of radar receivers is limited to a shape of the example aircraft platform 102 and the receivers are at varying distances from one another. Additionally or alternatively, any one or combination of the transceiver 104 and the receivers 108a, 108b, 108c, 108d, 108e, and 108f operate as transceivers.

Figure 2:
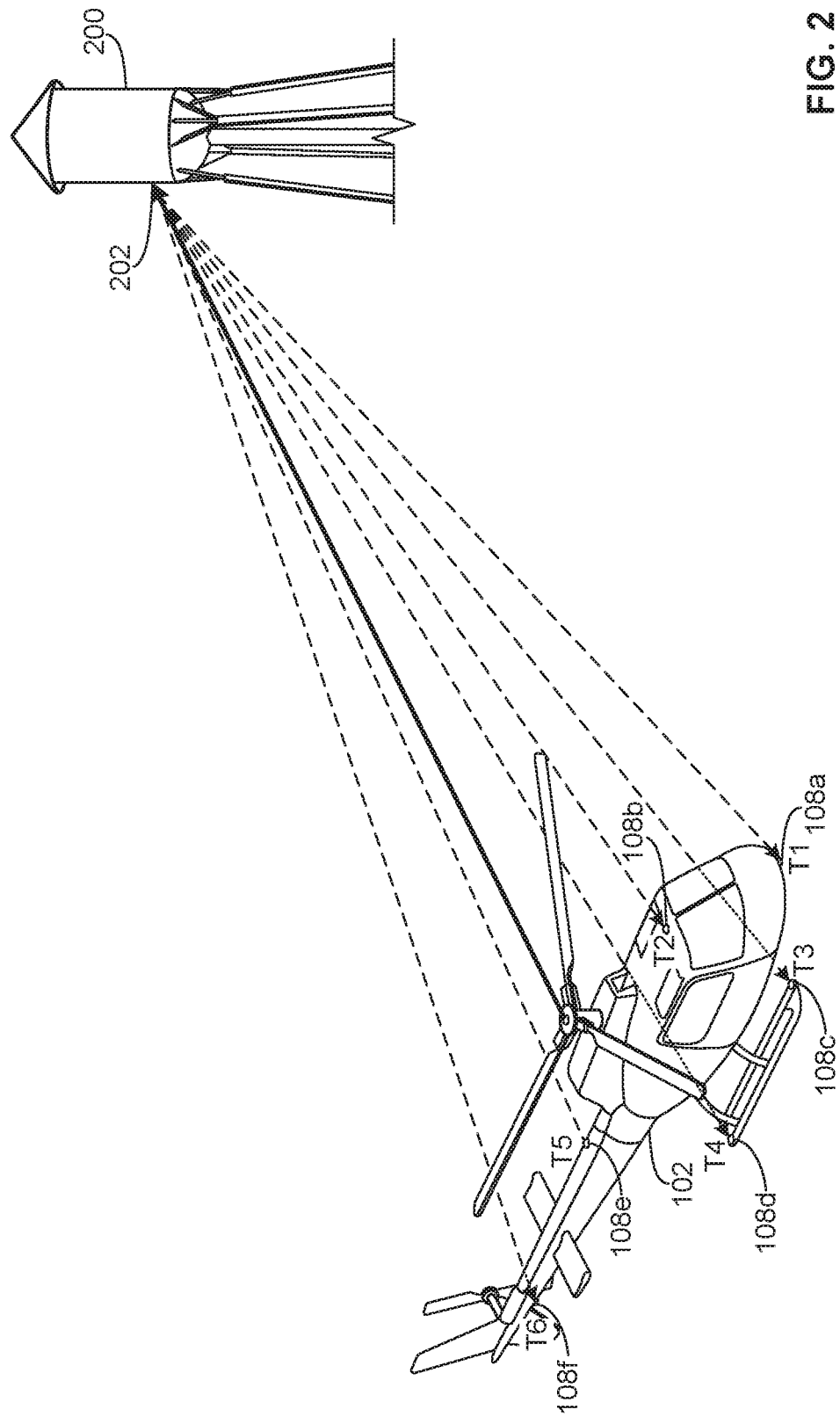
FIG. 2 illustrates an example operation of the example multi-node radar system using time delay to determine the location of an object.

FIG. 2 illustrates an example operation of the example multi-node radar system 100 using time delay (e.g., return time) to determine the location and angular position of an object 200. In the illustrated example, the object 200 is a water tower, however, in other examples the object could be a different stationary obstacle (e.g., buildings, utilities infrastructure, etc.), a projectile (e.g., missile), or changes in terrain.

The example aircraft platform 102 generates a radar signal via the example radar transceiver 104. For example, the radar signal can be omnidirectional. However, the radar signal could also be transmitted in a single direction and rotated such that the radar signal is transmitted in every direction about the aircraft, or the radar signal could be rotated using digital beamforming techniques. The example radar signal propagates outward unless reflected or refracted. In some examples, the radar signal reflects off the example object 200 at a background point 202 and is scattered in several directions. Some of the reflected radar signals propagate to the receivers 108a, 108b, 108c, 108d, 108e, and 108f of the multi-node radar system 100.

A time of travel from transmission of the radar signal to receiving the reflected radar signal at each of the receivers 108a, 108b, 108c, 108d, 108e, and 108f can be compared to determine the real distance of the background point 202 on the example object 200 from the aircraft platform 102. The reflected radar signal returns to each of the receivers 108a, 108b, 108c, 108d, 108e, and 108f and has a corresponding time T1, T2, T3, T4, T5, and T6 respectively. In some examples, a calculated distance between the background point 202 and the aircraft platform 102 varies in both the range and angular position because of inaccuracies associated with low frequency radar signals.

Because the time of travel of the radar signal is known and the location of the transmitter and receivers is known, the location of the object can be determined (e.g., both range and direction). When using time delay, for example, the transceiver 104 (acting only as a transmitter) and the example receiver 108a would only be able to narrow down the location of the background point 202 to the surface of an ellipsoid, however, the transceiver 104 and the example receivers 108a and 108e would be able to narrow down the location of the background point 202 to the intersection of two ellipsoids (e.g., isolate the location to the perimeter of an ellipse). A range and angular position for the example background point 202 can be determined on the simultaneous time delay calculation of the transceiver 104 and four example receivers 108a, 108b, 108d, and 108f.

Figure 3:
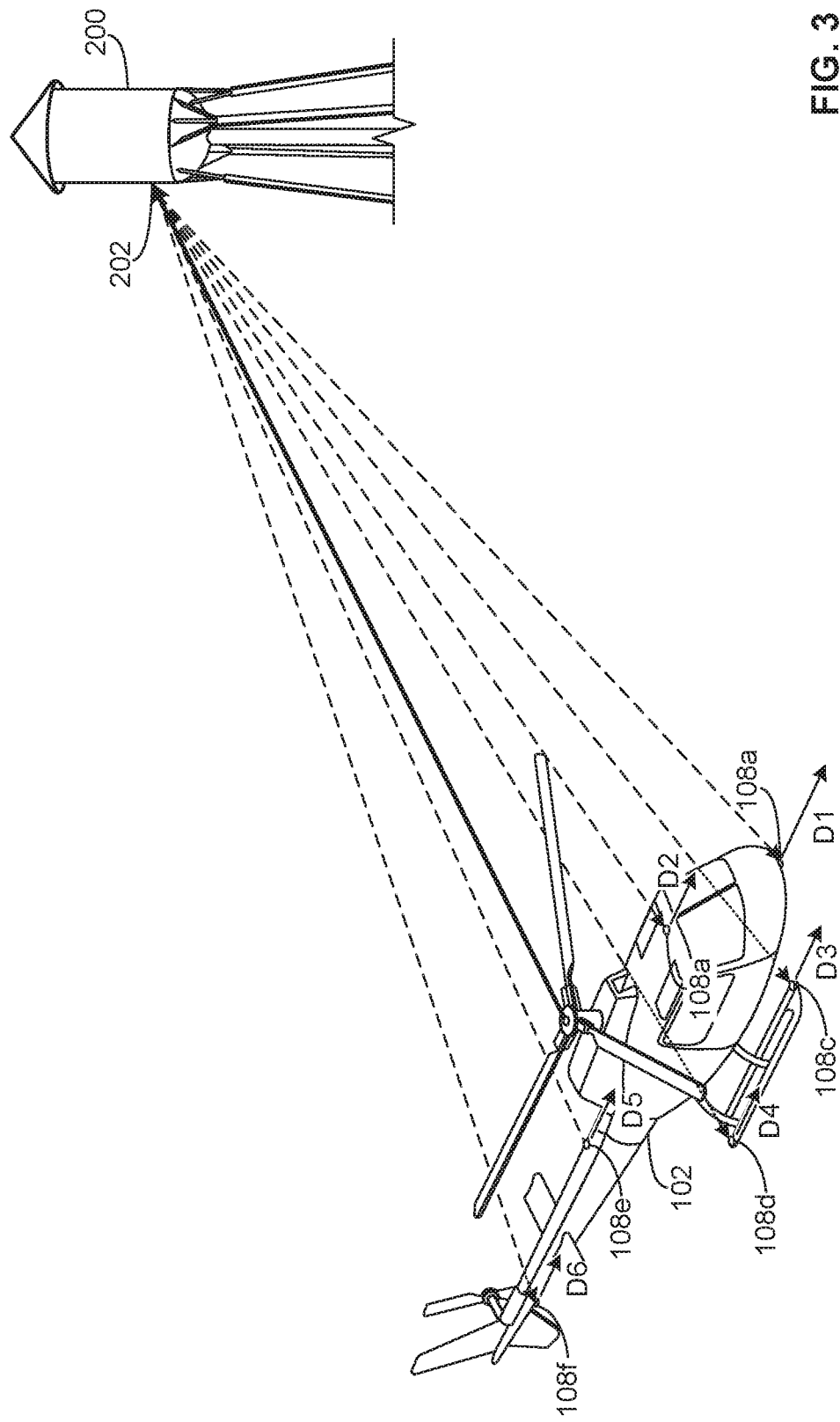
FIG. 3 illustrates an example operation of the example multi-node radar system using doppler shift to determine the velocity of an object relative to the individual sensing nodes.

FIG. 3 illustrates an example operation of the example multi-node radar system 100 using doppler shift to determine the velocity of the example object 200. In accordance with the present disclosure, the example operation of the multi-node radar system 100 using doppler shift to determine the velocity of the object 200 and the example operation of the multi-node radar system 100 using time delay to determine the location of an object 200 occur simultaneously, while in other examples, only one operation is enacted at a given time.

As illustrated in FIG. 1, the example aircraft platform 102 generates the radar signal via the example radar transceiver 104. The example radar signal is a sinewave signal having a known frequency, such as 2 gigahertz (GHz). In accordance with the Doppler effect, a radar signal reflecting off a moving target will undergo a shift in signal frequency. For example, if the example aircraft platform 102 is moving radially toward the object 200 the frequency will increase proportional to the speed of the aircraft platform 102 moving radially towards the object 200 or the frequency will decrease proportional to the speed of the aircraft platform 102 moving radially away from the object 200. Additionally or alternatively, object 200 is a moveable object, such as an aircraft, and the Doppler effect would undergo a shift in signal frequency proportional to the relative radial velocity between the aircraft platform 102 and the object 200.

The Doppler shift of the radar signal can vary, and each example receiver 108a, 108b, 108c, 108d, 108e, and 108f and has a corresponding Doppler shift D1, D2, D3, D4, D5, and D6 respectively. For example, the aircraft platform 102 overtaking the object 200 will detect an increase in the radar signal frequency at receiver 108*f* and a decrease in the radar signal frequency at receiver 108*a* when the object 200 is passing and travelling parallel the aircraft platform 102 and is between the receivers 108*a* and 108*f*.

In some examples, the Doppler effect can be used to detect where on the aircraft platform 102 an object 200 may contact the aircraft platform 102 for a given aircraft trajectory. An absence of Doppler effect indicates no radial movement in the direction of a radar receiver node, however a maxima of Doppler Effect detected at the example receiver 108*a* indicates the object 200 is likely to contact the example aircraft platform 102 at or around receiver 108*a*.

Additionally, the Doppler effect can also be used to determine the range and angular position of the example object 200. For a given shift in frequency and a known velocity of the example aircraft platform 102, there is a determined region of constant doppler. For a given receiver, a cone having its vertex at the receiver, defines a region of constant doppler. For example, along the surface of the example cone, there is no change in the Doppler effect.

In some examples, simultaneously solving for the region of constant Doppler for several example receivers, a range and location can be determined. For example, the example receiver 108*a* detects a frequency shift corresponding to a region of constant Doppler having a first angle, and similarly, the example receivers 108*c* and 108*d* detect a frequency shift corresponding to a region of constant Doppler having a second and third angle respectively. Each example receiver 108*a*, 108*c*, and 108*d* can only determine the location of the object in the region of constant doppler defined by the respective cone and an angle, however, at an intersection of the three cones, the range and angular position of the object 200 are determined.

Figure 4:
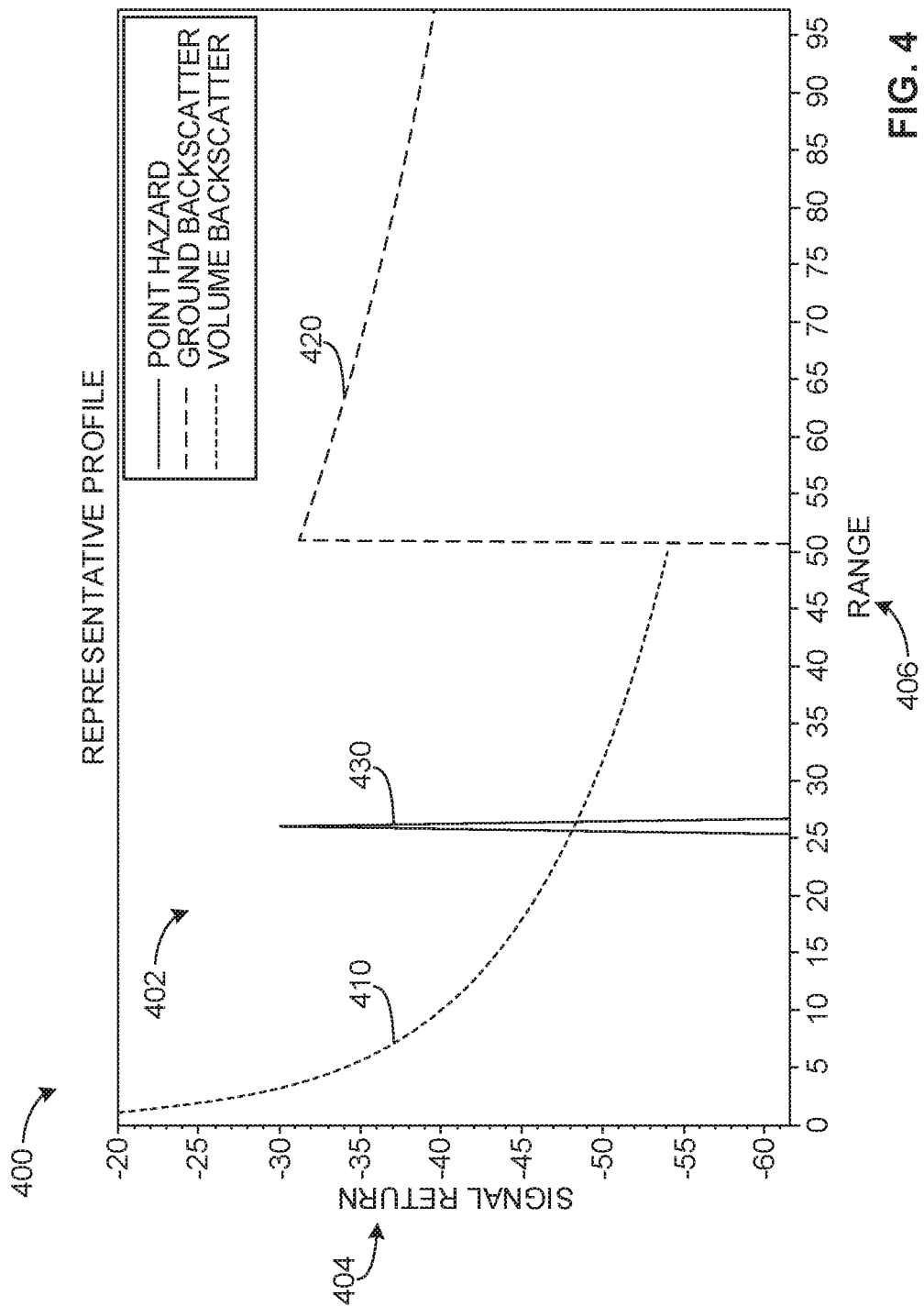
FIG. 4 is a radar return signal profile of example radar range data.

FIG. 4 is a radar return signal profile 400 of example radar range data 402. The radar range data 402 only detects range, and does not determine angular position of radar return signals. The example radar return signal profile 400 measures a return signal strength 404 against a range of detection 406. For example, the range of detection 406 is measured in yards (yd.) from the example aircraft platform 102, however, the range could also be measured in feet or meters. In the illustrated example, the radar signal was reflected by volume backscatter 410, ground backscatter 420, and a point hazard 430. In other examples, the radar range data can include more or less signal return on volume backscatter 410, can be out of range of the ground backscatter 420, and can have more or fewer point hazards 430.

Volume backscatter 410 detected in the example radar range data 402 is a result of inclement weather conditions (e.g., snow, sandstorm, fog, etc.). In some examples, the example multi-node radar system 100 does not receive radar data for ranges too close (e.g., less than 15 yd.) to the example aircraft platform 102 due to a high radar return signal strength. Additionally, ground backscatter 420 is also detected in the example radar range data 402. The illustrated example indicates that the aircraft platform 102 is at approximately 50 yd. of elevation and the terrain is relatively flat, however, the ground backscatter 420 varies with respect to the terrain in the vicinity of the example aircraft platform 102.

The radar range data 402 additionally includes the example point hazard 430. In some examples, the radar range data 402 can include more or fewer point hazards at any detected range. The point hazard 430 can be, for example, the object 200 as shown in FIGS. 2 and 3. In the illustrated example, after approximately 5 yd. the point hazard 430 or the ground backscatter 420 is discernable over the example volume backscatter.

Figure 5:
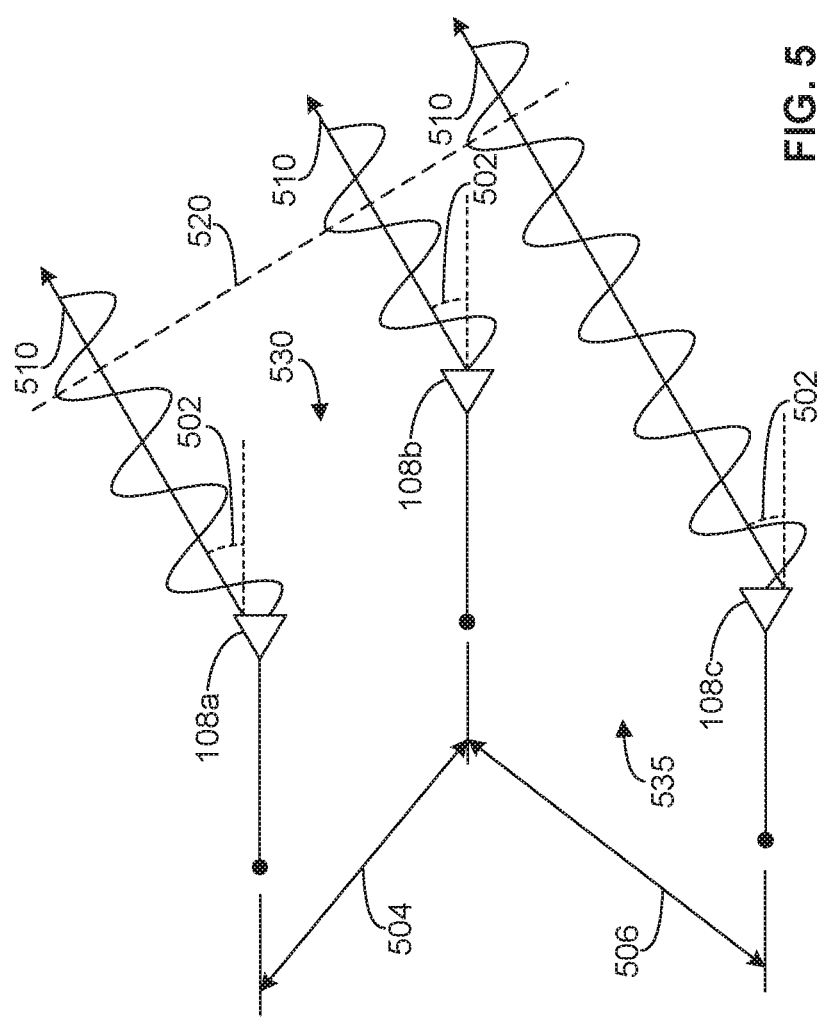
FIG. 5 illustrates an example operation of the example multi-node radar system using phase comparison to filter false angular returns in radar data.

FIG. 5 illustrates an example operation of the example multi-node radar system 100 using phase comparison to filter false angular returns in radar data. For example, three radar receivers 108*a*, 108*b*, and 108*c*, acting as transceivers, using digital beamforming technology to steer the radar signal in the direction of a scan angle 502. In the illustrated example, the three radar receivers 108*a*, 108*b*, and 108*c* are unevenly distributed having an example first distance 504 and an example second distance 506. In some examples, the example radar receivers 108*a*, 108*b*, and 108*c* are evenly distributed.

The receivers 108*a*, 108*b*, and 108*c* of the example multi-node radar system 100 receive a reflected radar signal 510 having traveled the same distance as it returns and passes a line 520, and as a result, there is no difference in phase between the three reflected radar signals along the line 520. However, due to the spacing of the receivers 108*a*, 108*b*, and 108*c*, the phase is not the same when received by the example receivers 108*a*, 108*b*, and 108*c*. The difference in phase detected at each of the example receivers 108*a*, 108*b*, and 108*c* can produce false angular return.

The detection of the example reflected radar signal 510 at different phases produces false radar detections at incorrect angular positions, otherwise known as grating lobes. In accordance with the present disclosure, processing and filtering the angular positions can reduce the number of grating lobes. For example, angular positions determined between receivers 108*a* and 108*b* against angular positions determined between receivers 108*b* and 108*c* can be compared and some grating lobes filtered.

In some examples, a first pair of receivers 530 including receivers 108*a* and 108*b* and a second pair of receivers 535 including receivers 108*b* and 108*c* both detect grating lobes. However, the grating lobes detected by both example pairs or receivers 530 and 535 are different and can be filtered against each other.

In some examples, the distance between receiver 108*b* and receiver 108*a* is two-thirds a transmitted radar signal wavelength and the distance between receiver 108*b* and 108*c* is three-quarters the transmitted radar signal wavelength. The reception of the reflected radar signals at an example scan angle 502 of thirty degrees produces predictable results. A radar signal having one-third wavelength phase difference received at receivers 108*b* and 108*a* would produce angular ambiguities, indicating the reflected signal could be at either thirty degrees or negative ninety degrees, however the radar signal received at receivers 108*b* and 108*c* would also produce angular ambiguities, indicating the reflected signal could be at either thirty degrees or fifty-six and one-half degrees. The processing of the angular ambiguities, via phase shift calculations, filters and removes grating lobes (e.g., ambiguous angular solutions).

Figure 6:
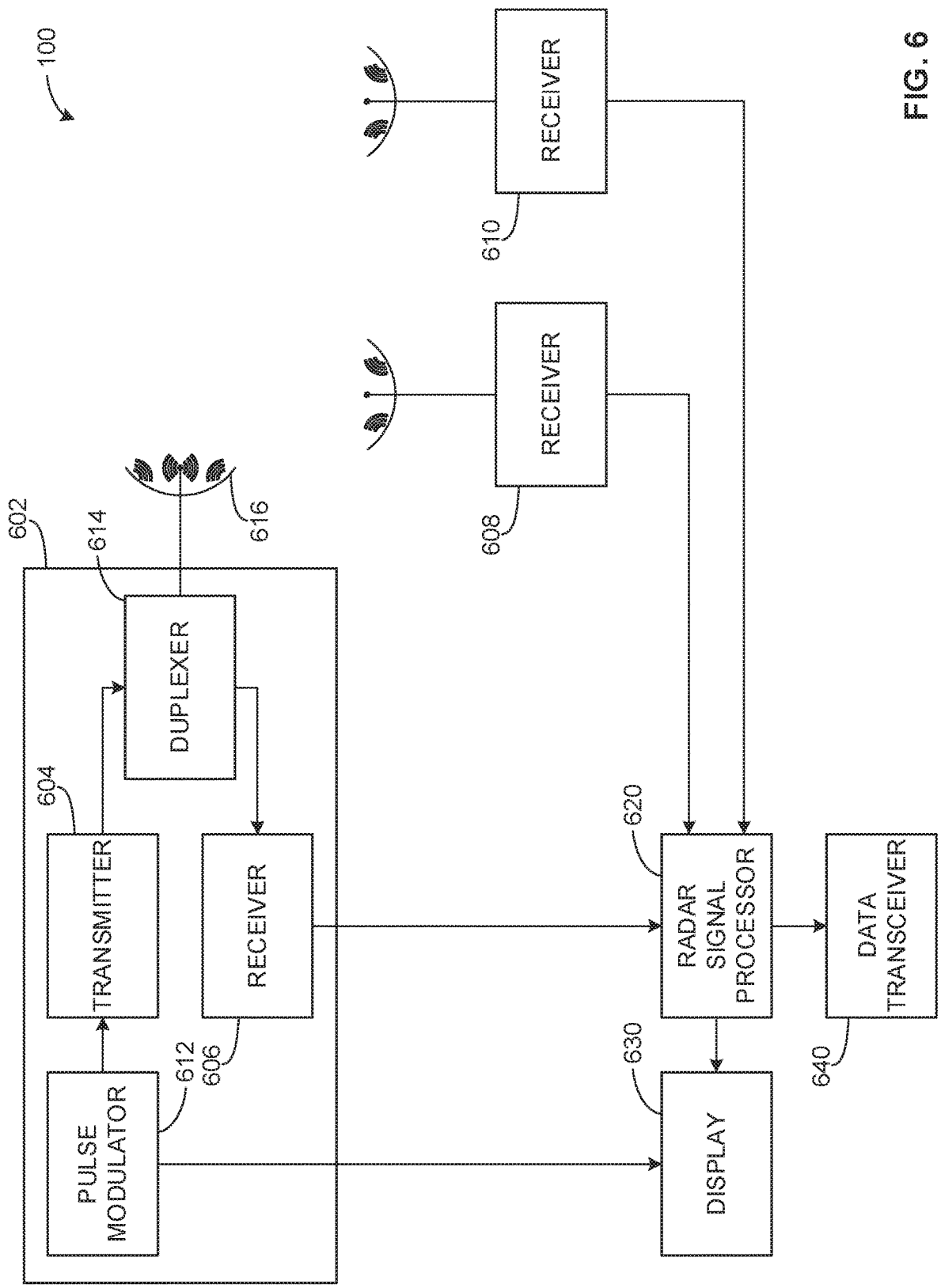
FIG. 6 is a block diagram of the example multi-node radar system, implemented in conjunction with the example aircraft platform of FIG. 1.

FIG. 6 is a block diagram of the example multi-node radar system 100, implemented in conjunction with the example aircraft platform 102 of FIGS. 1-3. In the illustrated example, the multi-node radar system 100 includes a radar unit 602, having a transmitter 604 and a first receiver 606, a second receiver 608, and a third receiver 610, but in other examples, the multi-node radar system 100 can include more or fewer radar receivers.

The radar unit 602 of the example multi-node radar system 100 generates the radar signal. For example, the transmitter 604 receives a pulse signal from a pulse modulator 612 which is transmitted when a duplexer 614 sends the signal to an antenna 616. The example duplexer 614 then sends all detected signals received by the antenna 616 to the first receiver 606 until a set time has elapsed for an additional radar signal to be transmitted. The set time for an additional radar signal to be transmitted is selected based on the desired range of the radar system to detect background points (e.g., a longer time interval detects over a longer range).

The multi-node radar system 100 also, for example, receives reflected radar signals at the example second receiver 608 and the example third receiver 610. In some examples, the second receiver 608 and the third receiver 610 are a second and third radar unit, similar to the example radar unit 602. The first, second, and third receivers 606, 608, and 610 send their radar data to a radar signal processor 620 to coalesce and filter the radar data. In some examples, after the radar data has been properly processed, it is sent to a display 630, such as a graphical display, to present a radar map alongside data from the pulse modulator 612.

Additionally or alternatively, the radar signal processor 620 can also send and receive radar data with other radar platforms via a data transceiver 640. For example, radar data received from a different radar platform can be coalesced and filtered with the radar data detected at the example first, second, and third receivers 606, 608, and 610.

Figure 7:
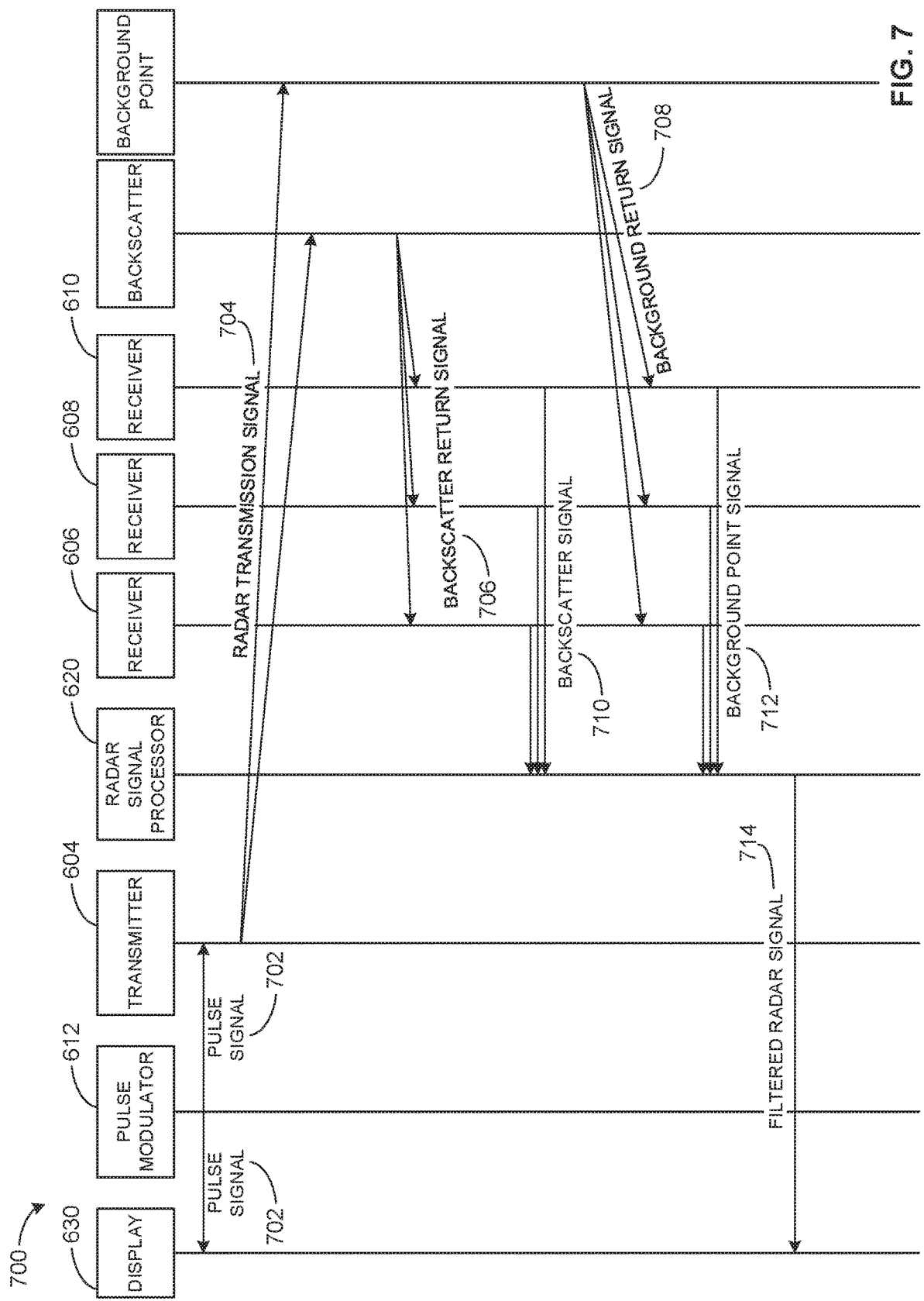
FIG. 7 is an example data flow diagram illustrating an example operation of the multi-node radar system.

FIG. 7 is an example data flow diagram 700 illustrating an example operation of the multi-node radar system 100 of FIG. 6 implemented in conjunction with the aircraft platform 102 of FIGS. 1-3. The data flow diagram 700 begins when the example pulse modulator 612 sends a pulse signal 702 to both the display 630 and the transmitter 604. When the transmitter 604 receives the example pulse signal 702, it generates a radar transmission signal 704 via the example antenna 616 of FIG. 6. The example radar transmission signal 704 propagates until it is reflected back by backscatter and the example background point 202 of FIGS. 2-3.

For example, the radar transmission signal 704 returns as either a backscatter return signal 706 (e.g., the volume backscatter 410 of FIG. 4) or a background return signal 708 (e.g., the point hazard 430 of FIG. 4). Upon the example backscatter return signal 706 being detected by receivers 606, 608, and 610, an example backscatter signal 710 is sent from the receivers 606, 608, and 610 to the radar signal processor 620. Additionally, upon the example background return signal 708 being detected by the receivers 606, 608, and 610, an example background point signal 712 is sent from the receivers 606, 608, and 610 to the radar signal processor 620.

In the illustrated example, the radar signal processor 620 receives the backscatter signal 710 and the background point signal 712 and coalesces and filters the data. The example radar signal processor 620 removes the backscatter signal 710 and refines the range and angular position determination. For example, the example radar signal processor 620 refines up the calculated distance of the background point by coalescing the return time and constant doppler calculations based on the background point signal 712. Additionally, the radar signal processor 620 refines the angular position of the example background point by coalescing the return time, constant doppler, and phase shift calculations.

After the backscatter signal 710 and the background point signal 712 are filtered by the radar signal processor 620, filtered radar signal 714 is sent to the display 630. The time from the pulse modulator 612 sending the example pulse signal 702 to the display of the example filtered radar signal 714 is approximately one millisecond. In some examples, the data flow diagram 700 continues as long as the system is operating, while in other examples, the system only operates in low altitude, inclement weather conditions.

Figure 8:
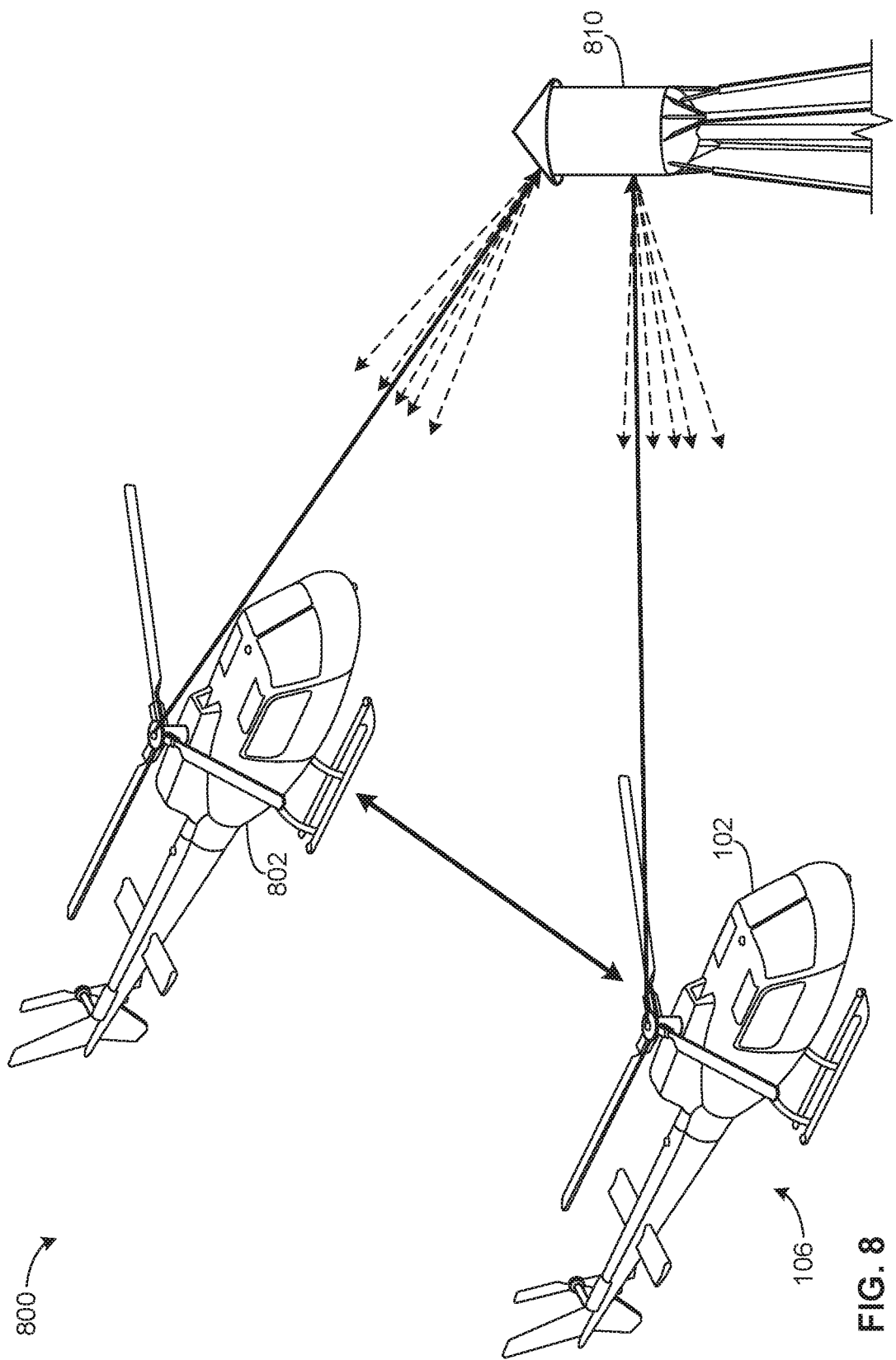
FIG. 8 illustrates an example operation of a multi-platform, multi-node radar system.

FIG. 8 illustrates an example operation of a multi-platform, multi-node radar system 800. In the illustrated example, aircraft platform 102 is a multi-node radar system 100 and aircraft platform 802 is a multi-node radar system, however, in other examples, both aircraft platforms 102 and 802 are typical radar systems or aircraft platform 102 is a multi-node radar system and aircraft platform 802 is a typical radar system. Additionally, both aircraft platforms 102 and 802 detect a utility structure 810 (e.g., a water tower). In some examples, more than two aircraft platforms can be included in the multi-platform, multi-node radar system 800.

The example aircraft platform 102 generates an omnidirectional low frequency radar signal and receives reflected radar signals off of the example utility structure 810. The example reflected radar signals are received at each of the distributed network of radar receivers 106. After processing and filtering the radar data, the example aircraft platform 102 transmits the processed and filtered radar data to aircraft platform 802. In some examples, aircraft platform 802 is also generating an omnidirectional low frequency radar signal and receiving reflected radar signal at each of the distributed network of radar receivers 106. In such examples, aircraft platform 802 processes and filters the radar data and transmits the processed and filtered radar data to aircraft platform 102.

In some examples, the radar data transmitted from aircraft platform 802 to aircraft platform 102 is additionally processed and filtered by aircraft platform 102 before inclusion in a radar map generated by the example aircraft platform 102. In other examples, the radar data transmitted from aircraft platform 802 is simply coalesced with the radar data generated by aircraft platform 102. The inclusion of additional radar data can improve the accuracy of the radar map generated or permit a radar map to sweep a larger region than would otherwise be possible.

Figure 9:
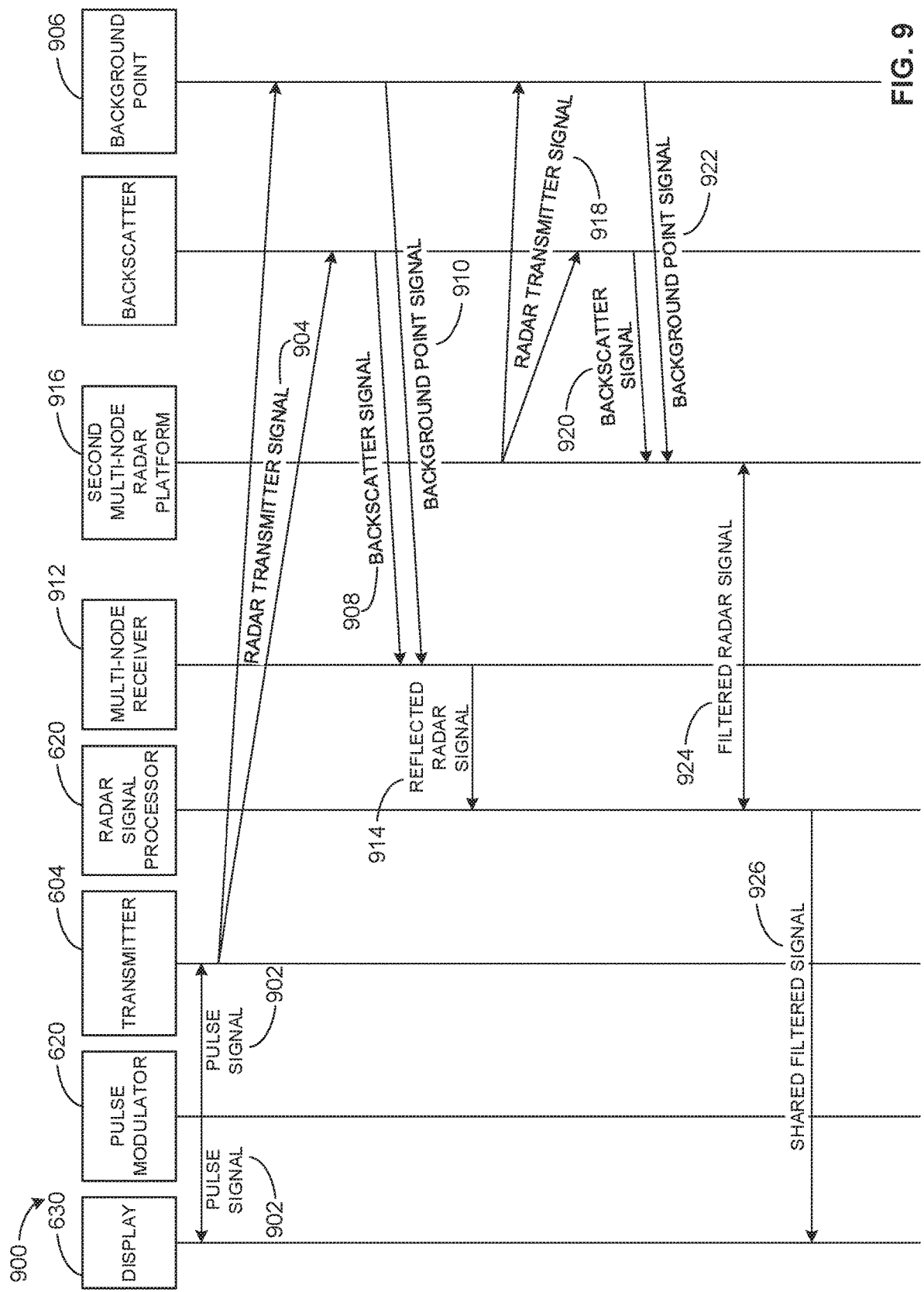
FIG. 9 is an example data flow diagram illustrating an example operation of the multi-platform, multi-node radar system.

FIG. 9 is an example data flow diagram 900 illustrating an example operation of the multi-platform, multi-node radar system 800 implemented in conjunction with the multi-node radar system 100 of FIGS. 1 and 6 and the multi-platform, multi-node radar system of FIG. 8. In some examples, the example data flow diagram 900 includes additional multi-node radar platforms.

The example data flow diagram 900 begins when the example pulse modulator 612 generates a pulse signal 902 and sends it to both the display 630 and the transmitter 604. After receiving the example pulse signal 902, the transmitter 604 transmits a radar transmitter signal 904. The example radar transmitter signal reflects off backscatter and a background point 906, such as the utility structure 810 of FIG. 8. Reflected radar signals, a backscatter return signal 908 and a background point return signal 910, are received at a multi-node receiver 912. The example multi-node receiver 912 can be implemented by the multi-node radar system 100 of FIG. 1 and FIG. 8, for example.

After receiving the example backscatter signal 906 and the example background point signal 908, the multi-node receiver 912 sends the reflected radar signal 914 to the radar signal processor 620. The example radar signal processor 620 coalesces and filters the reflected radar signal 914 to produce a more accurate radar map.

Additionally or alternatively, a second multi-node radar platform 916 transmits a radar transmitter signal 918 which reflects off backscatter and the example background point 906. The example second multi-node radar platform 916 receives the reflected radar signals, backscatter return signal 920 and background point return signal 922, and processes the reflected signals. The processing of reflected signals by the second multi-node radar platform 916 is similar to the processing done by the radar signal processor 620.

Both the example radar signal processor 620 and the second multi-node radar platform 916 transmit a filtered radar signal 924 after the radar data has been processed and filtered. In some examples, the radar signal processor 620 transmits to and receives from the second multi-node radar platform 916 the filtered radar signal 924 and further processes received data to improve the radar map. After processing the filtered radar signal 924, the radar signal processor 620 sends a shared filtered signal 926 to the example display 630. This process, from generation of the pulse signal 902 to sending of the example shared filtered signal 926 takes, for example, approximately one millisecond. In some examples, the process repeats until the system is shut off or the aircraft is no longer flying in low altitude or inclement weather conditions.

While an example manner of implementing the multi-node radar system 100 of FIG. 1 is illustrated in FIG. 6, one or more of the elements, processes and/or devices illustrated in FIG. 8 may be combined, divided, re-arranged, omitted, eliminated and/or implemented in any other way. Further, the example radar unit 602, the example transmitter 604, the example first receiver 606, the example second receiver 608, the example third receiver 610, the example pulse modulator 612, the example duplexer 614, the example antenna 616, the example radar signal processor 620, the example display 630, the example data transceiver 640 and/or, more generally, the example multi-node radar system 100 of FIG. 6 may be implemented by hardware, software, firmware and/or any combination of hardware, software and/or firmware. Thus, for example, any of the example radar unit 602, the example transmitter 604, the example first receiver 606, the example second receiver 608, the example third receiver 610, the example pulse modulator 612, the example duplexer 614, the example antenna 616, the example radar signal processor 620, the example display 630, the example data transceiver 640 and/or, more generally, the example multi-node radar system 100 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, radar unit 602, the example transmitter 604, the example first receiver 606, the example second receiver 608, the example third receiver 610, the example pulse modulator 612, the example duplexer 614, the example antenna 616, the example radar signal processor 620, the example display 630, the example data transceiver 640 and/or, more generally, the example multi-node radar system 100 of FIG. 6 is/are hereby expressly defined to include a non-transitory computer readable storage device or storage disk such as a memory, a digital versatile disk (DVD), a compact disk (CD), a Blu-ray disk, etc. including the software and/or firmware. Further still, the example multi-node radar system 100 of FIG. 6 may include one or more elements, processes and/or devices in addition to, or instead of, those illustrated in FIG. 6, and/or may include more than one of any or all of the illustrated elements, processes and devices.

A flowchart representative of example machine readable instructions for implementing the multi-node radar system 100 of FIG. 1 is shown in FIG. 6. In this example, the machine readable instructions comprise a program for execution by a processor such as the processor 1612 shown in the example processor platform 1600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIGS. 10-15, many other methods of implementing the example multi-node radar system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 10-15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 10:
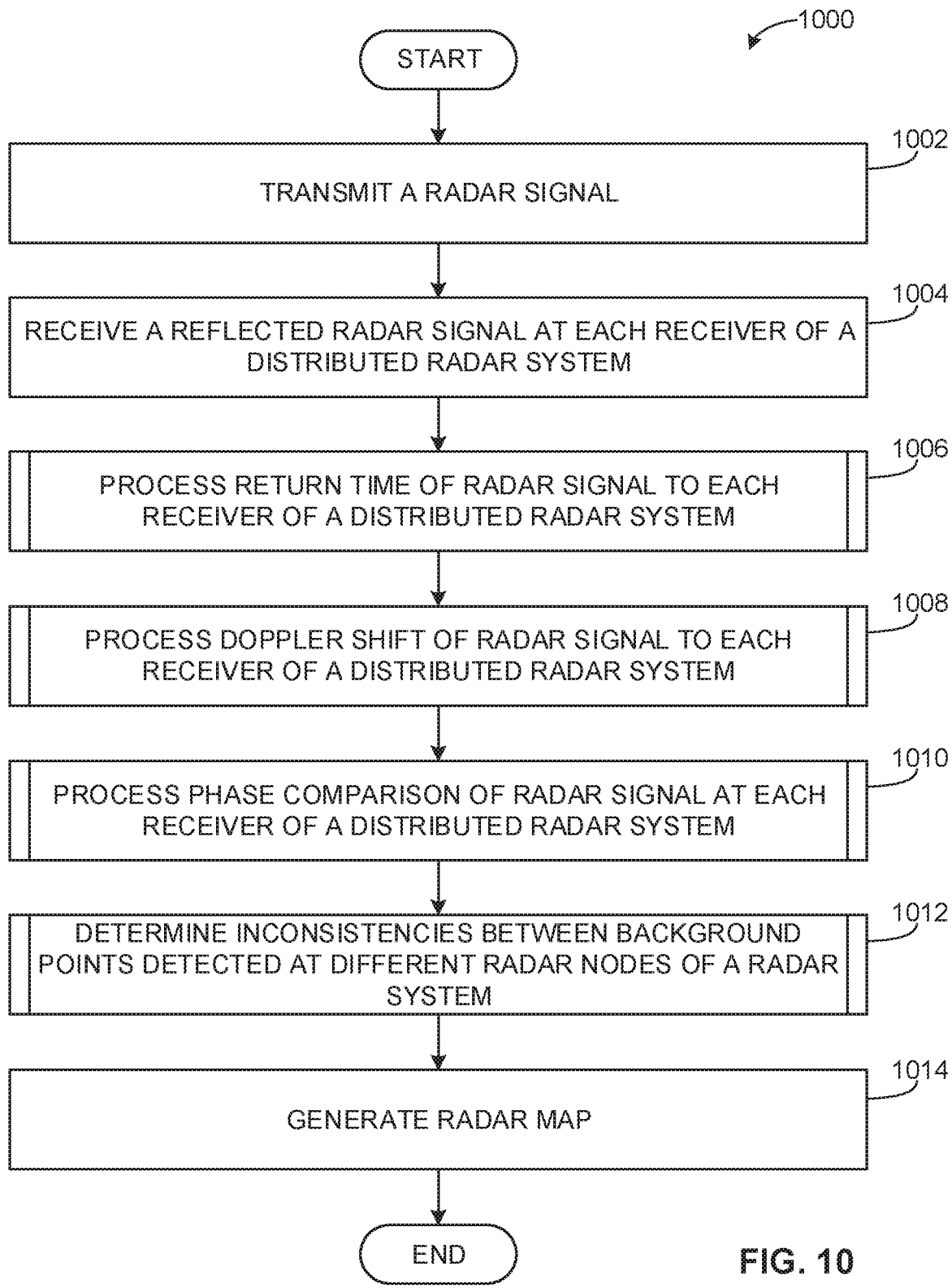
FIG. 10 is a flowchart representative of an example method that may be executed by the example multi-node radar system of FIG. 6 for operation of the multi-node radar system.

FIG. 10 is a flowchart representative of an example method 1000 that can be executed by the example multi-node radar system 100 of FIG. 6 for operation of the multi-node radar system 100 of FIG. 1. The example method 1000 can be performed at least in part by machine readable instructions executed by the multi-node radar system 100 of FIG. 6. Additionally, the example method 1000 is described in connection with the example aircraft platform 102 of FIG. 1, but can, in some examples, be applicable to other radar designs and arrangements.

In the illustrated example, the method 1000 begins at block 1002. At block 1002, the transmitter 604 transmits a radar signal via the example duplexer 614 and antenna 616. In some examples, the antenna 616 is used solely for transmitting radar signals and is not connected to the example transmitter 604 via the example duplexer 614. After the radar signal is transmitted the method 1000 continues to a second block 1004.

At block 1004, the first receiver 606, the second receiver 608, and the third receiver 610 receive a reflected radar signal. For example, the radar signal scatters in all directions after hitting the example utility structure 810 of FIG. 8, and some of the radar signal reflects back to be received at the first, second, and third receivers 606, 608, and 610 respectively. A radar signal propagates in one direction unless it comes into contact with an object. In such examples, no reflected radar signal would return to the first, second, and third receivers 606, 608 and 610 respectively. After receiving the example reflected radar signal, the method continues to a block 1006.

At block 1006, the radar signal processor 620 processes the return time of reflected radar signals. The example radar signal processor 620, in processing the return time of the reflected radar signals, determines the range traveled by the reflected radar signals. The determined range for each receiver is then coalesced to further determine an angular position of the example object 200. After the example radar signal processor 620 determines the range and angular position of the reflected radar signals, the method continues to a block 1008.

At block 1008, the radar signal processor 620 processes the frequency shift of the reflected radar signal. The example radar signal processor 620 compares the transmitted radar frequency to the received frequency (e.g., determines a doppler shift of the radar signal) to determine the radial velocity of the object that reflected the transmitted radar signal and the corresponding constant doppler cone. In some examples, the constant doppler cone determined for each receiver is coalesced to determine both a range and angular position of the example utility structure. After the example radar signal processor 620 determines the range and angular position based on the reflected radar signal, the method 1000 continues to a block 1010.

At block 1010, the radar signal processor 620 processes a radar signal for phase differences between the example pairs of receivers 530 and 535 of the example distributed network of radar receivers 106. In some examples, there is no phase difference either due to ideal spacing of receivers or the reflected radar signal travelling the same distance to each receiver, therefore requiring no phase difference comparison. Processing multiple pairs of radar receivers, such as the example pairs of receivers 530 and 535 of FIG. 5, allows for the filtering out of grating lobes. After the phase comparison has been completed for all receivers of the example distributed network of radar receivers 106, the method 1000 continues to block 1012.

At block 1012, the radar signal processor 620 evaluates range and angular position data and evaluates for inconsistencies between the several received radar signals and refines the range and angular position data and further filters out backscatter. In some examples, the range and angular position of the example object 200 of FIG. 2 is refined based on the coalescing of return time data, doppler shift data, and phase comparison data. After the example radar signal processor 620 refines the processed radar data, the method 1000 continues to block 1014.

In some examples, the location and distribution of the radar receivers 108a, 108b, 108c, 108d, 108e, and 108f are along a preferred axis (e.g., a primary flight axis). In such examples, processing the return time of reflected radar signals provides high resolution for objects along the preferred axis, and processing the frequency shift of reflected radar signal provides high resolution for objects perpendicular to the preferred axis. As a result, the two techniques are, in some examples, complementary. Additionally or alternatively, radar receivers located on rotating blades can provide variable relative geometry and provide high resolution in both the return time and Doppler techniques.

At block 1014, the radar data is sent from the example radar signal processor 620 to the display 630. In some examples, the pulse modulator 612, in connection with the transmitter 604, also sends generated pulse signals to the display 630. The example display 630 generates a radar map. After the display 630 generates a radar map based on the radar data, the method 1000 restarts at block 1002.

Figure 11:
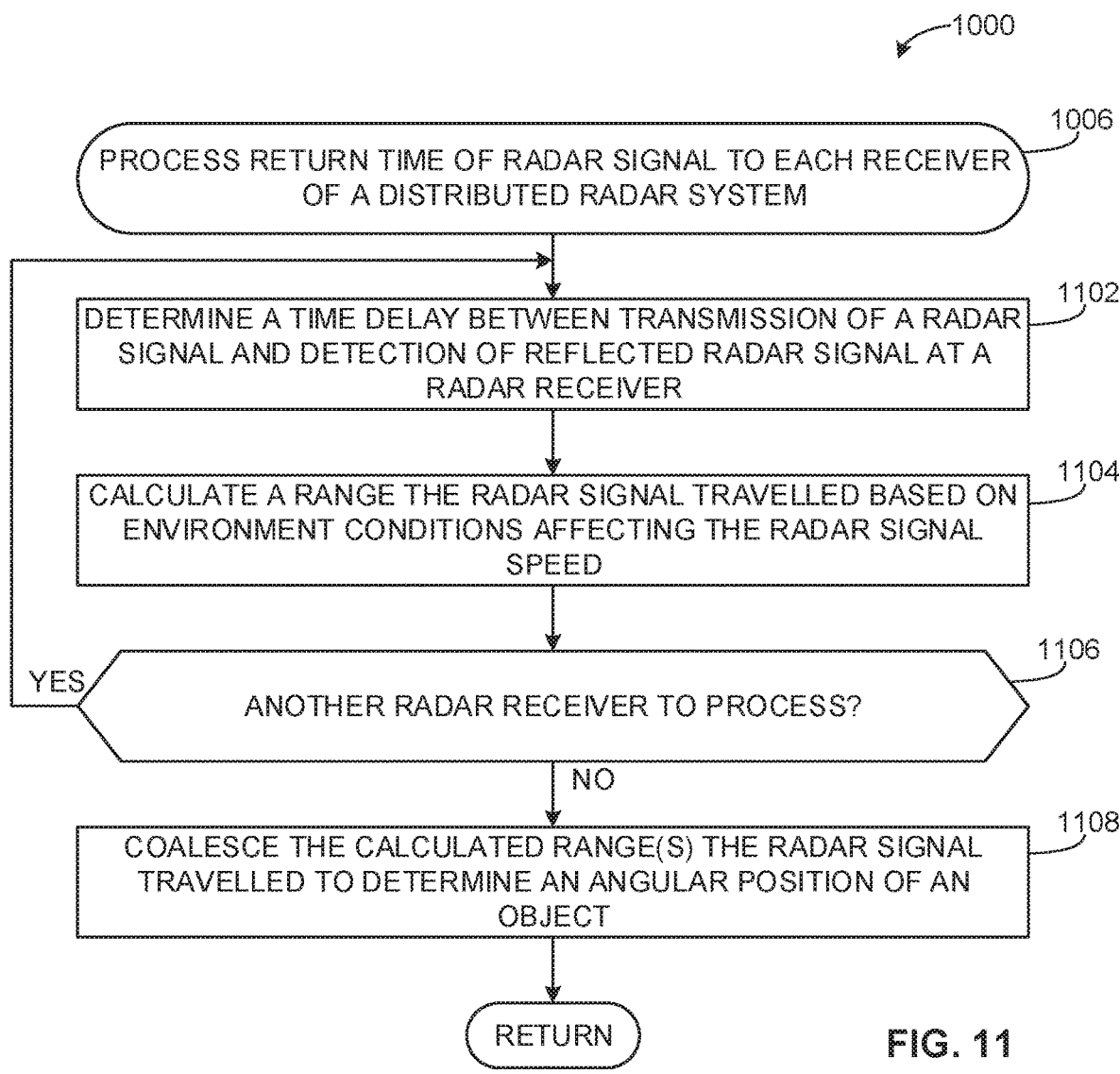
FIG. 11 is a flowchart representative of an example method that may be executed by the example multi-node radar system of FIG. 6 for processing a time return of radar signals received by the example multi-node radar system.

FIG. 11 is a flowchart representative of an example implementation of the example block 1006 of the method 1000 that can be executed by the example multi-node radar system 100 of FIG. 6 to process a return time of radar signals received by the example multi-node radar system 100 of FIG. 2. The implementation of the example block 1006 can be performed in part by machine readable instructions executed by the multi-node radar system 100 of FIG. 6. Additionally, the example block 1006 is described in connection with the example aircraft platform 102 of FIG. 1, but can, in some examples, be applicable to other radar designs and arrangements.

At block 1102, the example radar signal processor 620 of FIG. 6 determines a time delay between transmission of a radar signal and detection of a reflected radar signal. In some examples, time delay of a radar signal between transmission and detection of the reflected signal is on the order of microseconds. After the example radar signal processor 620 determines the time delay, the method 1000 continues to block 1104.

At block 1104, the example radar signal processor 620 calculates a range the radar signal traveled. In some examples, the range is the product of the speed of the radar signal (e.g., the speed of light in air) and the time delay divided by two. In other examples, the range equation for a reflected radar signal defines the shape of an ellipsoid having its foci at the transmitter and receiver. After the radar signal processor 620 calculates the example range, the method 1000 continues to block 1106.

At block 1106, the example radar signal processor 620 determines if additional radar signals are to be processed. If there are more radar signals to be processed, the example method 1000 returns to block 1102, otherwise, if there are no more radar signals to process, the example method 1000 continues to block 1108.

At block 1108, the radar signal processor 620 determines the range and angular position of any objects detected by the transmitted radar signal based on coalescing range data for each receiver. In some examples, the radar signal processor 620 does not detect any objects, detects one object, or detects multiple objects in the transmission of a single radar signal. After the example radar signal processor 620 determines the range and angular position of objects detected, the method 1000 returns to the block 1008 of FIG. 10.

Figure 12:
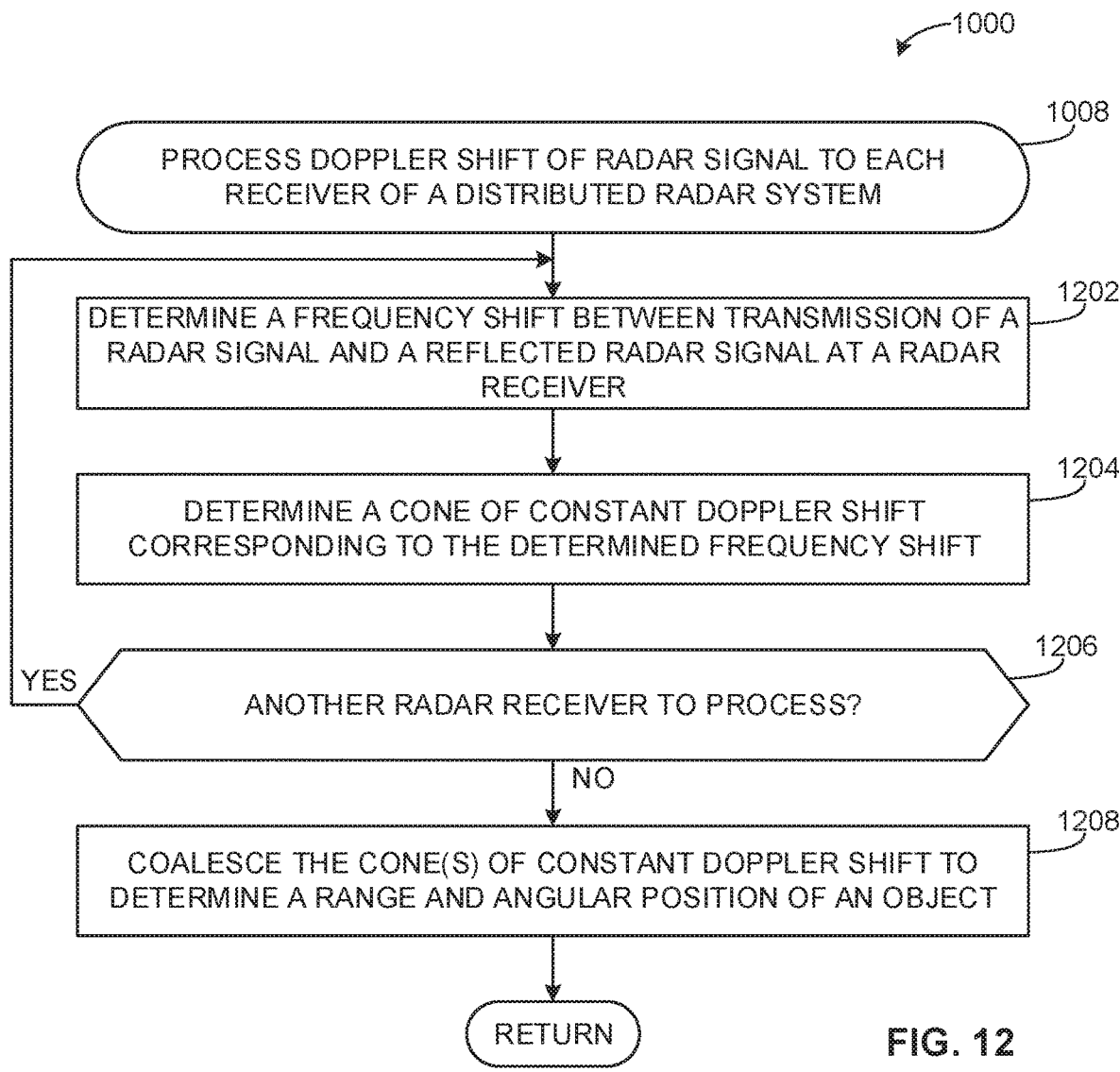
FIG. 12 is a flowchart representative of an example method that may be executed by the example multi-node radar system of FIG. 6 for processing a doppler shift of radar signals received by the example multi-node radar system.

FIG. 12 is a flowchart representative of an example implementation of the example block 1008 of the method 1000 that can be executed by the example multi-node radar system 100 of FIG. 6 for determining a range and angular position of an object by processing a doppler effect on radar signals received by the example multi-node radar system 100 of FIG. 3. The implementation of the example block 1008 can be performed in part by machine readable instructions executed by the multi-node radar system 100 of FIG. 6. Additionally, the example block 1008 is described in connection with the example aircraft platform 102 of FIG. 1, but can, in some examples, be applicable to other radar designs and arrangements.

At block 1202, the example radar signal processor 620 determines a frequency shift between a transmitted radar signal and a received radar signal. In some examples, the frequency of the reflected radar signal is different from the transmitted radar signal due to the radar signal reflecting off an object having, at least partially, a radial velocity in relation to the example aircraft platform 102. For example, an object moving toward the example aircraft platform 102 causes the frequency of the reflected radar signal to be increased, and an object moving away from the example aircraft platform 102 causes the frequency to decrease. After the frequency shift is determined, the method 1000 continues to block 1204.

At block 1204, the radar signal processor 620 determines a cone of constant doppler based on the frequency shift detected at block 1202. For example, the radial velocity is calculated as the product of the frequency shift and the wavelength divided by negative two. Additionally, for a given frequency shift, there exists a constant doppler cone that exhibits the same doppler shift along the surface of the cone. After the velocity of the object has been calculated and the constant doppler cone determined, the example method 1000 continues to block 1206.

At block 1206, the radar signal processor 620 determines if additional radar signals are to be processed. If additional radar signals are to be processed, the method 1000 returns to the example block 1202, otherwise the method 1000 continues to block 1208.

At block 1208, the radar signal processor 620 coalesces the constant doppler cones to determine a range and angular position of the example object 200 of FIG. 2. Additionally, the example radar signal processor 620 determines the relative velocity of any objects detected by the transmitted radar signal and produces doppler shift data. In some examples, the radar signal processor 620 does not detect any objects, detects one object, or detects multiple objects in the transmission of a single radar signal. After the example radar signal processor 620 determines the range, angular position, and velocity of objects detected, the method 1000 returns to block 1010 of FIG. 10.

Figure 13:
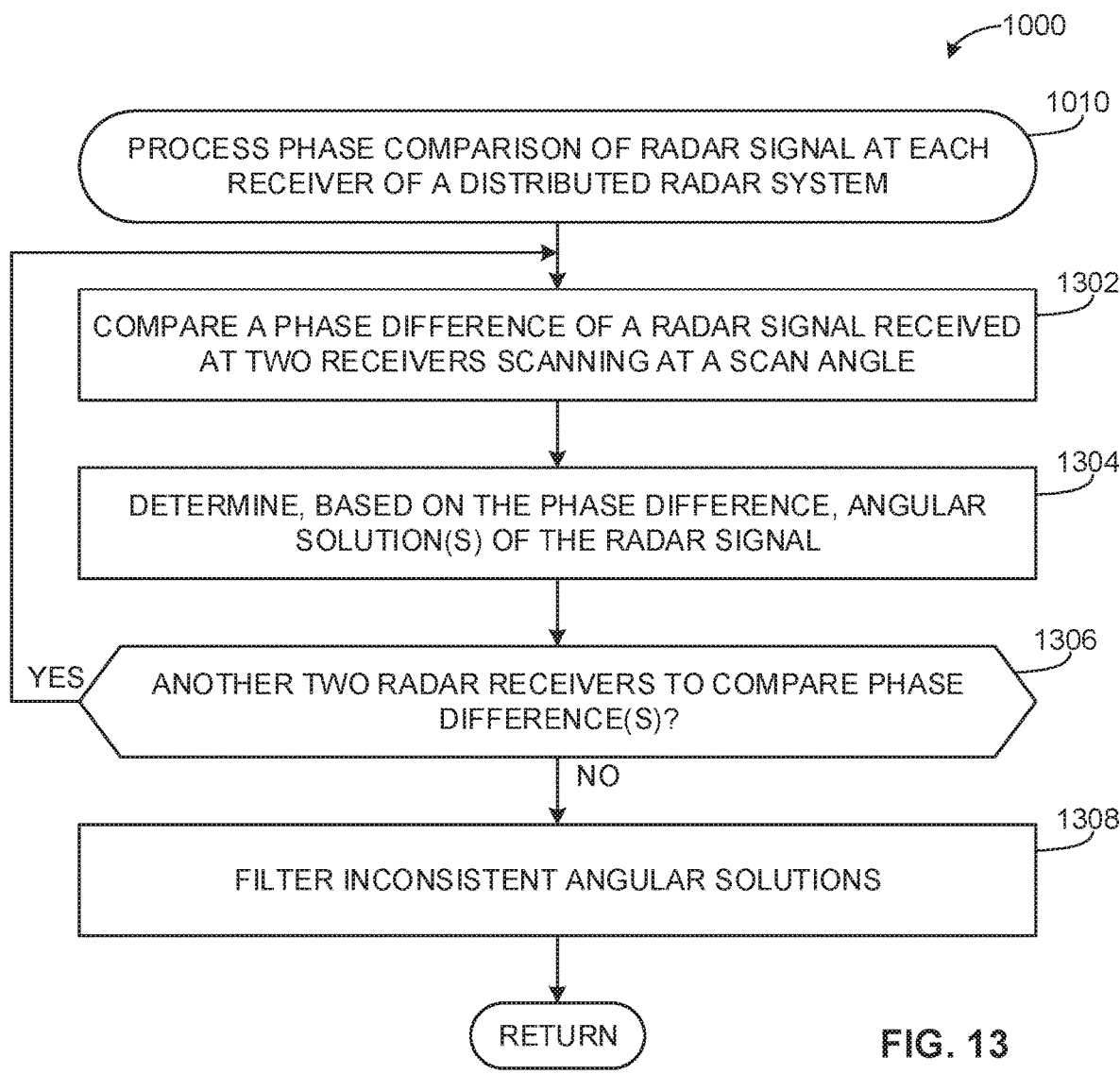
FIG. 13 is a flowchart representative of an example method that may be executed by the example multi-node radar system of FIG. 6 for processing phase comparison of radar signals received by the example multi-node radar system.

FIG. 13 is a flowchart representative of an example method that may be executed by the example multi-node radar system 100 of FIG. 6 for processing phase comparison of radar signals received by the example multi-node radar system 100. Phase comparison is used to filter grating lobes (e.g., ambiguous angular solutions), for example. Additionally or alternatively, an increased number of receivers being processed via phase comparison refines the angular position determination. The implementation of the example block 1010 can be performed in part by machine readable instructions executed by the multi-node radar system 100 of FIG. 6. Additionally, the example block 1010 is described in connection with the example aircraft platform 102 of FIG. 1, but can, in some examples, be applicable to other radar designs and arrangements.

At block 1302, the radar signal processor 620 compares a phase difference of a radar signal received at a pair of receivers scanning at a scan angle. In some examples, the phase might be detected at one third wavelength at one receiver and at three quarters wavelength at a different receiver. After the phase difference has been compared at a pair of receivers, the method 1000 continues to block 1304.

At block 1304, the radar signal processor 620 determines angular solutions of the radar signal based on phase differences. For example, the reception of a radar signal at two different phases produces angular position ambiguity. After the example radar signal processor 620 determines the angular solutions, the method 1000 continues to block 1304.

At block 1306, the radar signal processor 620 determines if additional pairs of radar receivers are to be compared. If additional pairs of radar receivers are to be compared, the method 1000 returns to block 1302, otherwise the method 1000 continues to block 1308.

At block 1308, the radar signal processor 620 filters inconsistent angular solutions. The example radar signal processor 620 processes the angular solutions based on phase comparison calculations in order to identify and filter out grating lobes. Filtering grating lobes includes removing grating lobes known or determined to be false. After the example radar signal processor 620 removes inconsistent angular solutions, the method 1000 returns to block 1012 of FIG. 10.

Figure 14:
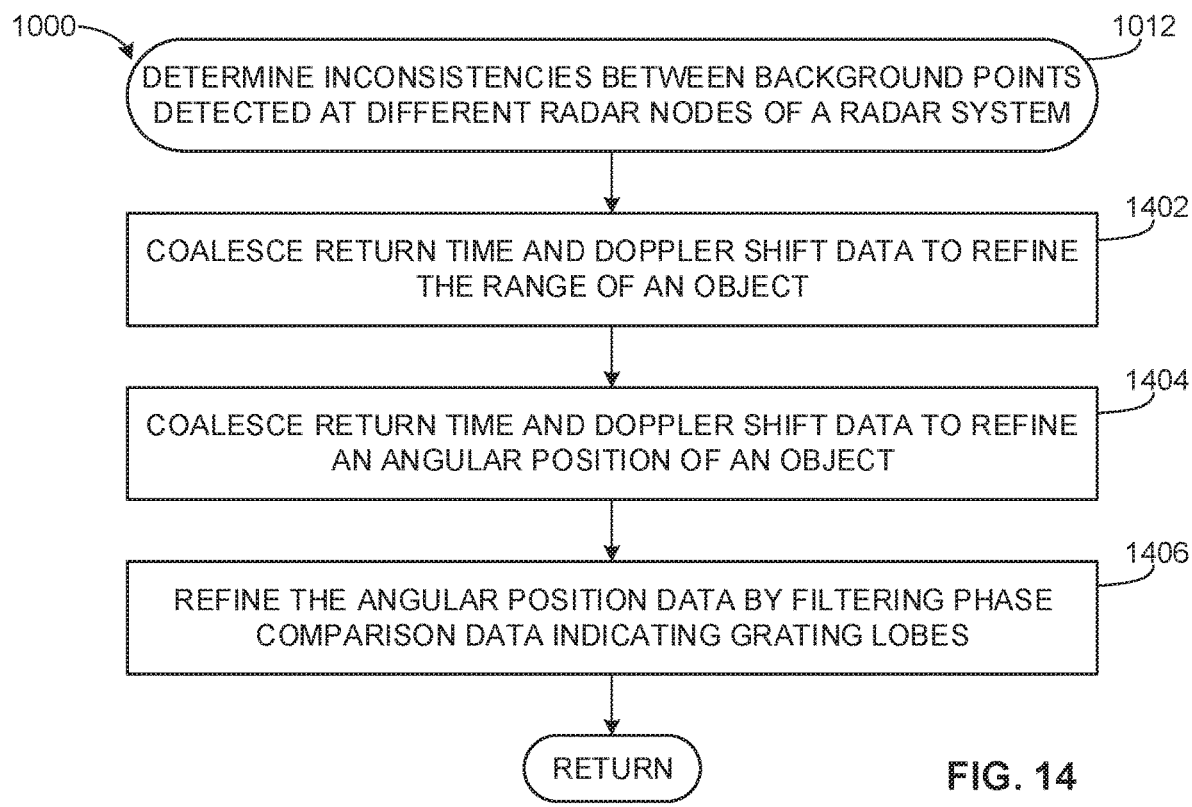
FIG. 14 is a flowchart representative of an example method that may be executed by the example multi-node radar system of FIG. 6 for processing received radar signals and refining radar data.

FIG. 14 is a flowchart representative of an example block 1012 of the method 1000 that can be executed by the example multi-node radar system 100 of FIG. 6 for processing received radar signals and identifying backscatter. The implementation of the example block 1012 can be performed in part by machine readable instructions executed by the multi-node radar system 100 of FIG. 6. Additionally, the example block 1012 is described in connection with the example aircraft platform 102 of FIG. 1, but can, in some examples, be applicable to other radar designs and arrangements.

At block 1402, the radar signal processor 620 coalesces return time and doppler shift range data to refine range data for example background objects. For example, the range data calculated by measuring the return time of a radar signal and the range data calculated by the processing of constant doppler cones is averaged to produce more refined and accurate range data. In other examples, the processing of the constant doppler cones is by Kalman filter, thresholding, maximum likelihood estimation, etc. After the example radar signal processor 620 refines the range data, the method 1000 continues to block 1404.

At block 1404, the radar signal processor 620 coalesces return time and doppler shift angular position data to refine an angular position of example background objects. In some examples, the refining of the range and angular position for background objects is done simultaneously (e.g., refined by averaging the values, using a Kalman filter, thresholding, etc.). Additionally or alternatively, one set of data can be given a coalescing weight to favor one set of data over another, based on the example aircraft platform 102 operation or ambient environment conditions. After the angular position of example background objects has been refined, the method 1000 continues to block 1406.

At block 1406, the radar signal processor 620 uses phase comparison data to refine the angular position data by filtering grating lobes. In some examples, phase comparison data filters grating lobes indicating false positive signals and removes those grating lobes from the radar data. After the example radar signal processor 620 has further refined the angular position data, the method 1000 returns to block 1014 of FIG. 10.

Figure 15:
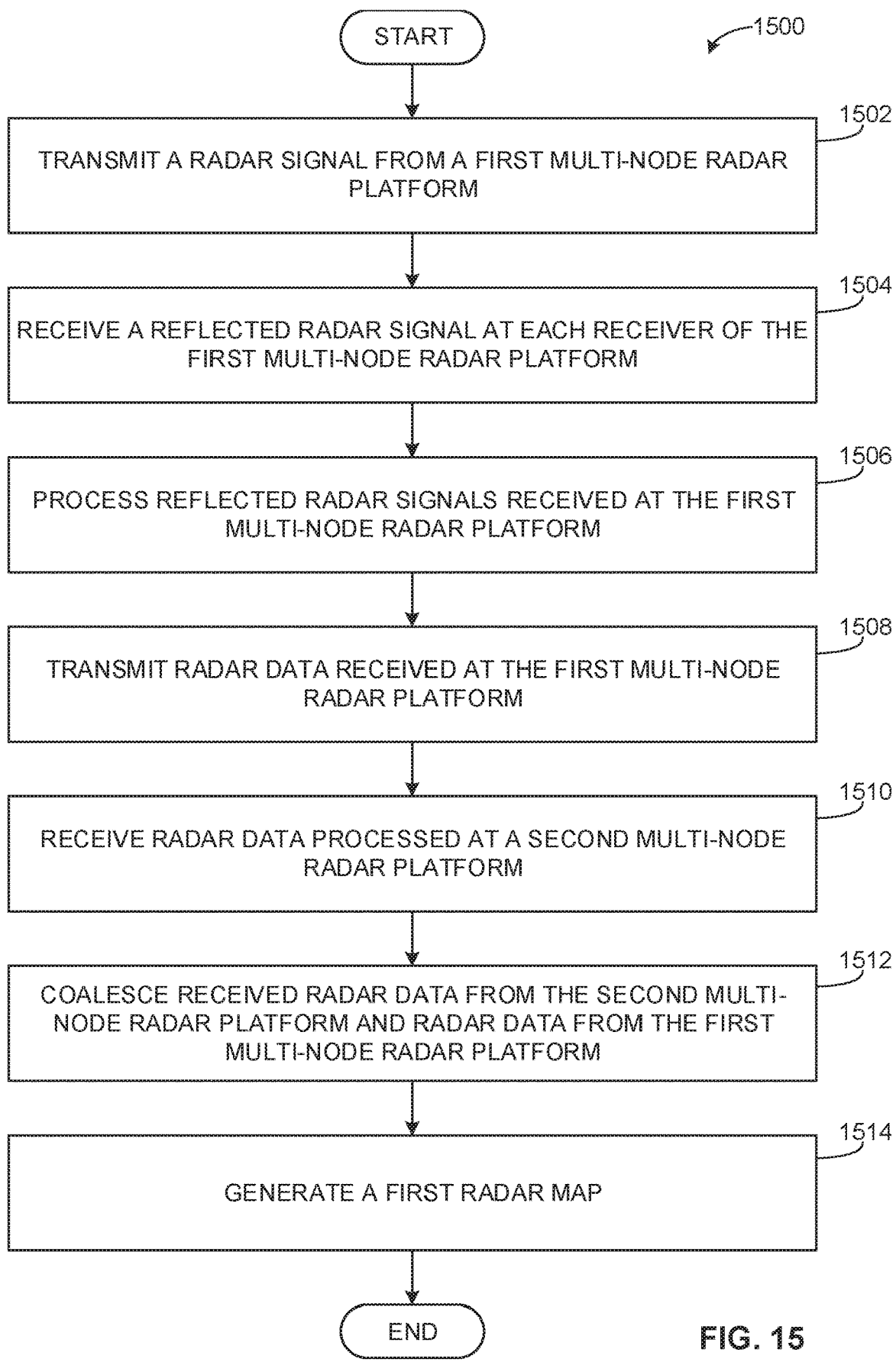
FIG. 15 is a flowchart representative of an example method that may be executed by the example multi-node radar system of FIG. 6 for processing radar data from a second radar system source.

FIG. 15 is a flowchart representative of an example method 1500 that can be executed by the example multi-node radar system 100 of FIG. 6 to process radar data from the example second multi-node radar platform 916 of FIG. 9. The example method 1500 can be performed in part by machine readable instructions executed by the multi-node radar system 100 of FIG. 6. Additionally, the example method 1500 is described in connection with the example aircraft platform 102 of FIG. 1 and the example second multi-node radar platform 916 of FIG. 9, but can, in some examples, be applicable to other radar designs and arrangements.

At block 1504, the example multi-node radar system 100 transmits a radar signal from the example aircraft platform 102. For example, the multi-node radar system 100 transmits a low-frequency radar signal. After the multi-node radar system 100 transmits a radar signal, the method 1500 continues to block 1506.

At block 1506, reflected radar signals are received at each of the receivers of the example multi-node radar system 100. In some examples, the method 1500 can be executed with a single-node radar system. After the reflected radar signals are received, the method 1500 continues to block 1506.

At block 1506, the radar signal processor 620 processes the reflected radar signals. In some examples, the radar signal processor 620 processes the reflected radar signals in accordance with the example method 1000 of FIG. 10. In other examples, other processing techniques are used to process the reflected radar signals. After the reflected radar signals have been processed, the method 1500 continues to block 1508.

At block 1508, the data transceiver 640 transmits the processed reflected radar signals to the example second multi-node radar platform 916. In some examples, the example data transceiver 640 transmits the processed reflected radar signals to a central processing facility, and the central processing facility forwards the processed reflected radar data to the second multi-node platform 916. Additionally, the transmission can be encrypted. After the transmission of processed reflected radar data, the method 1500 continues to block 1510.

At block 1510, the data transceiver 640 receives example processed reflected radar signals from the second multi-node radar system 916. In the illustrated example of FIG. 8, the aircraft platform 802 is in direct communication with the example aircraft platform 102. The example data transceiver 640 sends the received processed reflected radar signal to the radar signal processor 620. After the radar signal processor 620 accesses the received reflected radar signal data, the method 1500 continues to block 1512.

At block 1512, the radar signal processor 620 coalesces and processes radar signal data, including radar signal data received at the multi-node radar system 100 and radar signal data received at the second multi-node radar system 916. In some examples, the additional radar signal data is used to further refine the radar data generated at the example multi-node radar system 100. In other examples, the received reflected radar signal data is simply added to the existing processed radar signal data. After the radar signal processor 620 processes radar signal data, the method 1500 continues to block 1514.

At block 1514, the display 630 receives all radar signal data and generates a radar map. For example, the radar map is a visual, presented on a graphical display, to assist a pilot of the example aircraft platform 102 to fly in a degraded visual environment (e.g., fog, snow, brownout, etc.). Additionally or alternatively, the radar map is coalesced with other sensor systems to provide additional assistance to a pilot flying without visual attitude flying methods. In some examples, the graphical display is located with a ground-based controller operated in connection with a UAV or drone. After the radar map is generated, the method 1500 returns to block 1504 unless the system is otherwise turned off, disabled, suspended, etc. In addition to operating as two independent radar systems which receive returns from the transmissions of the other radar system, the two sets of nodes can also be processed as a single radar system, or both radar systems processed simultaneously. In order to process as a single radar consisting of extended nodes, a relative position, orientation and velocity between the platforms must be known. In some examples, this knowledge is determined using the multi-node radar system 100, while in other examples, other techniques can be used. One advantage of processing as a single extended system, is that the geometry often provides enhanced resolution. In the example where nodes lie primarily along the primary flight axis on each platform, having two platforms flying abreast will provide advantageous time resolution for objects perpendicular to travel, and enhanced Doppler differences for objects near the direction of travel. It is noted that the multi-platform, multi-node radar system directly complements the single platform, multi-node radar system.

Figure 16:
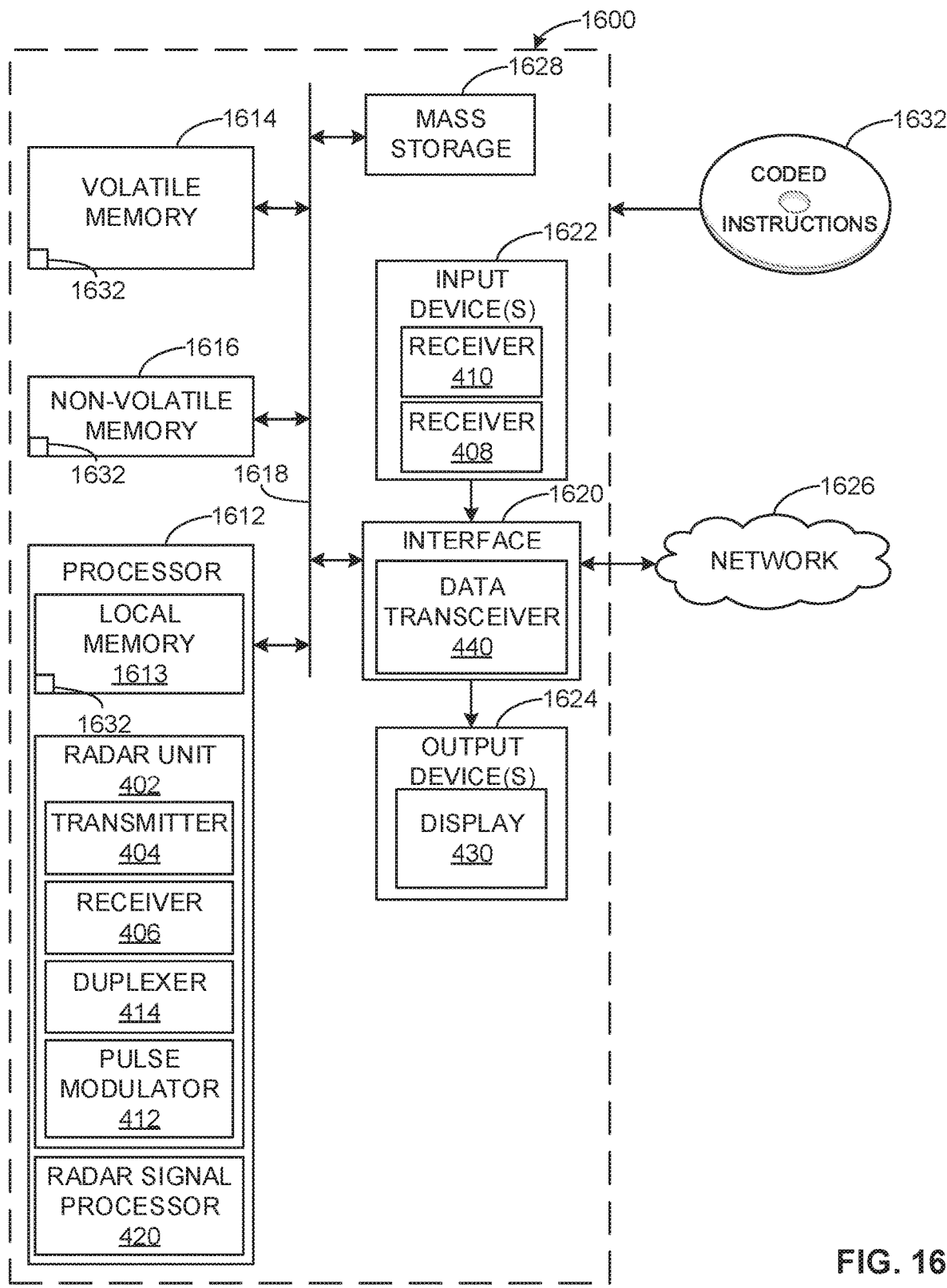
FIG. 16 is an example processor platform diagram that may implement the methods of FIGS. 10-15, data flow diagrams of FIG. 6 and FIG. 7, and the example multi-node radar system of FIG. 6.

FIG. 16 is a block diagram of an example processor platform 1600 capable of executing the instructions of FIGS. 10-15 to implement the apparatus of FIG. 6. The processor platform 1600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer. The hardware processor may be a semiconductor based (e.g., silicon based) device. In this example, the processor implements the example radar unit including the example pulse modulator 612, the example transmitter 604, the example first receiver 606, and the example duplexer 614, the example second receiver 608, the example third receiver 610, and the example display 630.

The processor 1612 of the illustrated example includes a local memory 1616 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 10-15 may be stored in the mass storage device 1628, in the volatile memory 1614, in the non-volatile memory 1616, and/or on a removable tangible computer readable storage medium such as a CD or DVD.

From the foregoing, it will be appreciated that example methods, apparatus and articles of manufacture have been disclosed that improve the accuracy of radar maps. In particular, the present disclosure improves the accuracy of radar systems disposed on moving platforms, such as aircraft operating in inclement weather using low frequency radar signals received at a distributed network of radar receivers. Receiving radar signals at multiple receivers, coalescing the data, and filtering the results provides an improved radar map. Additionally, use of low frequency radar frequencies allows for the generation of accurate radar maps in inclement weather conditions. In some examples, distribution of radar systems across multiple platforms further improves the effectiveness of the present disclosure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A multi-node radar system comprising:
a radar transmitter configured to transmit a radar signal;
a distributed network of radar receivers configured to receive a reflected radar signal reflecting off an object at a background point, at each radar receiver of the distributed network of radar receivers in response to the radar signal transmitted; and
a processor configured to:
determine a first range and a first angular position of the background point based on a return time detected at each radar receiver of the distributed network of radar receivers to determine a location of the object, wherein the first range and the first angular position are included in first radar data and simultaneously determine a second range and a second angular position of the background point based on a doppler shift of the reflected radar signals detected at each radar receiver of the distributed network of radar receivers to determine a radial velocity of the object, wherein the second range and the second angular position are included in second radar data;
refine the first and second range of the background point by at least coalescing the return time and constant doppler calculations based on the doppler shift and refine the first and second angular position of the background point by at least coalescing the return time, the constant doppler calculations and phase shift calculations to respectively determine a refined range and a refined angular position of the background point, wherein the refined range and the refined angular position are included in third radar data; and
generate a radar map based on the third radar data.

2. The multi-node radar system of claim 1, wherein the processor is further to filter out grating lobes based on phase comparison calculations determining false angular returns.

3. The multi-node radar system of claim 2, further including a display to visually present the radar map generated based on the third radar data.

4. The multi-node radar system of claim 2, wherein the multi-node radar system is disposed on an aircraft platform.

5. The multi-node radar system of claim 1, wherein the multi-node radar system is a first radar system, further including:
a data transceiver configured to:
send the third radar data to a second radar system spaced apart from the first radar system and the object, wherein the second radar system generates a radar signal towards the object and receives and processes reflected radar signals from the object in a same manner as the first radar system and sends fourth radar data including a filtered radar signal to the processor of the first radar system,
wherein the processor is configured to further process the fourth radar data and coalesce the third radar data from the first radar system and the fourth radar data from the second radar system to improve an accuracy of a radar map.

6. The multi-node radar system of claim 5, wherein the first radar system and the second radar system communicate via a central processing facility.

7. The multi-node radar system of claim 1, wherein the radar signal is a low frequency radar signal.

8. A method to improve radar map resolution in a degraded visual environment, the method including:
receiving a low frequency, reflected radar signal reflecting off an object at a background point, at each radar receiver of a distributed network of radar receivers in response to a radar signal transmitted;
determining, by executing instructions via a processor, a first range and a first angular position of the background point based on a return time detected at each radar receiver of the distributed network of radar receivers to determine a location of the object, wherein the first range and the first angular position are included in first radar data and determine a radial velocity of the object;
simultaneously determining, by executing instructions via the processor, a second range and a second angular position of the background point based on a doppler shift of the reflected radar signals detected at each radar receiver of the distributed network of radar receivers to determine a radial velocity of the object, wherein the second range and the second angular position are included in second radar data;

refining the first and second range of the background point by at least coalescing the return time and constant doppler calculations based on the doppler shift and refine the first and second angular position of the background point by at least coalescing the return time, the constant doppler calculations and phase shift calculations to respectively determine a refined range and a refined angular position of the background point, wherein the refined range and the refined angular position are included in third radar data; and generating a radar map based on the third radar data.

9. The method of claim 8, wherein the processor is further to filter out grating lobes based on phase comparison calculations determining false angular returns.

10. The method of claim 9, further including visually presenting the radar map on a graphical display based on the third radar data.

11. The method of claim 9, wherein the distributed network of radar receivers is disposed on an aircraft platform.

12. The method of claim 8, further including:
sending the third radar data to a second radar system spaced apart from the first radar system and the object, wherein the second radar system generates a radar signal towards the object and receives and processes reflected radar signals from the object in a same manner as the first radar system and sends fourth radar data including a filtered radar signal to the processor of the first radar system;
processing, via the processor of the first radar system, the fourth radar data; and
coalescing, via the processor, the third radar data from the first radar system and the fourth radar data from the second radar system to improve accuracy of a radar map.

13. The method of claim 12, wherein the third radar data and the fourth radar data are sent and received via a central processing facility.

14. A non-transitory computer readable storage medium comprising instructions that, when executed, cause an at least one processor to at least:
transmit a low frequency radar signal;
receive a reflected radar signal reflecting off an object at a background point, at each radar receiver of a distributed network of radar receivers in response to the radar signal transmitted;
determine a first range and a first angular position of the background point based on a return time detected at each radar receiver of the distributed network of radar receivers to determine a location of the object, wherein the first range and the first angular position are included in first radar data;

simultaneously determine a second range and a second angular position of the background point based on a doppler shift of the reflected radar signals detected at each radar receiver of the distributed network of radar receivers to determine a radial velocity of the object, wherein the second range and the second angular position are included in second radar data;

refine the first and second range of the background point by at least coalescing the return time and constant doppler calculations based on the doppler shift and refine the first and second angular position of the background point by at least coalescing the return time, the constant doppler calculations and phase shift calculations to respectively determine a refined range and a refined angular position, wherein the refined range and the refined angular position is included in third radar data; and generate a radar map based on the third radar data.

15. The non-transitory computer readable storage medium of claim 14, further including instructions that, when executed, cause the at least one processor to filter out grating lobes based on phase comparison calculations determining false angular returns.

16. The non-transitory computer readable storage medium of claim 15, further including instructions that, when executed, cause a display to visually present the radar map based on the third radar data.

17. The non-transitory computer readable storage medium of claim 16, wherein the distributed network of radar receivers is disposed on an aircraft platform.

18. The non-transitory computer readable storage medium of claim 15, further including instructions that, when executed, cause the at least one processor to:
send the third radar data to a second radar system spaced apart from the first radar system and the object, wherein the second radar system generates a radar signal towards the object and receives and processes reflected radar signals from the object in a same manner as the first radar system and sends fourth radar data including a filtered radar signal to the processor of the first radar system;
process via the processor of the first radar system, the fourth radar data; and
coalesce, via the processor, the third radar data from the first radar system and the fourth radar data from the second radar system to improve an accuracy of a radar map.

19. The non-transitory computer readable storage medium of claim 18, wherein the first radar data and the second radar data are sent and received via a central processing facility.

20. The non-transitory computer readable storage medium of claim 14, wherein the low frequency radar signal has a frequency shorter than 10 gigahertz.

* * * * *